United States Patent
Lewis et al.

(10) Patent No.: US 9,562,784 B2
(45) Date of Patent: Feb. 7, 2017

(54) GUIDED NAVIGATION OF A MINING VEHICLE

(71) Applicant: Modular Mining Systems, Inc., Tucson, AZ (US)

(72) Inventors: Michael W. Lewis, Tucson, AZ (US); Andree Rottig, Tucson, AZ (US); Lucas Van Latum, Tucson, AZ (US)

(73) Assignee: MODULAR MINING SYSTEMS, INC., Tucson, AZ (US)

( * ) Notice: Subject to any disclaimer, the term of this patent is extended or adjusted under 35 U.S.C. 154(b) by 0 days.

(21) Appl. No.: 14/745,269

(22) Filed: Jun. 19, 2015

(65) Prior Publication Data

US 2015/0285650 A1 Oct. 8, 2015

Related U.S. Application Data

(60) Continuation of application No. 14/052,543, filed on Oct. 11, 2013, now Pat. No. 9,157,754, which is a division of application No. 13/217,113, filed on Aug. 24, 2011, now Pat. No. 8,583,361.

(51) Int. Cl.
*G01C 21/34* (2006.01)
*G07C 5/08* (2006.01)
*G01S 19/13* (2010.01)

(52) U.S. Cl.
CPC ....... *G01C 21/3407* (2013.01); *G01C 21/3461* (2013.01); *G01S 19/13* (2013.01); *G07C 5/0816* (2013.01); *G07C 5/0841* (2013.01)

(58) Field of Classification Search
CPC ... G01C 21/3407; G01S 19/13; G07C 5/0816; G07C 5/0841; G07C 21/3461
See application file for complete search history.

(56) References Cited

U.S. PATENT DOCUMENTS

| | | | |
|---|---|---|---|
| 6,188,937 B1* | 2/2001 | Sherry | G01S 13/91 701/14 |
| 2005/0216190 A1* | 9/2005 | Obata | G01C 21/3415 701/442 |
| 2008/0228436 A1* | 9/2008 | Farritor | B61K 9/08 702/150 |
| 2009/0082953 A1* | 3/2009 | Shimizu | G01C 21/28 701/466 |
| 2009/0135051 A1* | 5/2009 | Bishop | G01S 13/89 342/175 |
| 2009/0210145 A1* | 8/2009 | Amano | G01C 21/36 701/533 |
| 2009/0234577 A1* | 9/2009 | Rinscheid | G01C 21/3415 701/533 |
| 2010/0185353 A1* | 7/2010 | Barwick | B60K 17/30 701/23 |
| 2011/0106376 A1* | 5/2011 | Tijerina | B60Q 1/346 701/36 |
| 2014/0278066 A1* | 9/2014 | Gottlieb | G01C 21/3682 701/454 |

* cited by examiner

*Primary Examiner* — Rodney Butler
(74) *Attorney, Agent, or Firm* — Quarles & Brady LLP

(57) ABSTRACT

A system and method for guided navigation of a mining vehicle are presented. A position sensor is mounted to a haul truck. The position sensor is configured to identify a position of the haul truck. A navigation aid is configured to identify a target destination for the haul truck, calculate a path including the target destination, and use the position sensor to monitor a progress of the haul truck along the path. A user interface is configured to display at least a portion of the path to an operator of the haul truck.

10 Claims, 13 Drawing Sheets

GUIDED NAVIGATION OF A MINING VEHICLE

This application is a continuation of U.S. patent application Ser. No. 14/052,543 entitled "GUIDED MANEUVERING OF A MINING VEHICLE TO A TARGET DESTINATION" and filed on Oct. 11, 2013, which is a divisional application of and incorporates by reference U.S. patent application Ser. No. 13/217,113 entitled "GUIDED MANEUVERING OF A MINING VEHICLE TO A TARGET DESTINATION" and filed on Aug. 24, 2011.

FIELD OF THE INVENTION

This disclosure is related to systems and methods for providing automated guidance directions to operators of heavy equipment, and specifically, to a system and method for providing guidance maneuvering assistance to heavy equipment operators in proximity with other heavy equipment, hazards, or geographical features.

BACKGROUND OF THE INVENTION

Mining environments, particularly open pit surface mining environments, present unique challenges to maintaining safe operation of vehicles. The workhorse of a modern surface mine is a mine haul truck, which is a dump truck capable of hauling up to four hundred, and in some cases over four hundred, tons of material. Haul trucks are some of the largest land vehicles ever built. As such, they are characterized by limited maneuverability, relatively slow acceleration and deceleration, and poor sight lines on every side of the vehicle. In particular, the rear and side opposite to the operator's cabin of a mine-haul truck present enormous blind spots for the haul truck operator.

Within a mining environment there may be many other vehicles such as shovels, dozers, bucket wheel excavators, or other equipment that are each similarly difficult to control. Because the vehicles are so large, they can have large blind spots, large turning radii, and slow braking capabilities, making navigating the vehicles to a given destination extremely difficult. In many cases, though, by accurately positioning these vehicles in proximity to other vehicles or geographical features of the mine, the mine's efficiency can be greatly improved. Additionally, through accurate navigation, dangers of injury or property damage resulting from a collision can be mitigated.

In one example of conventional pit mining operations, material is blasted from a face, picked up by a shovel, and loaded into the bed of a haul truck. The haul truck then moves the material to a crusher for processing. Shovels can be several times larger than a haul truck. A typical electric shovel can measure 100 feet in length from the rear of the crawler portion to the end of the bucket. The overall height of the shovel can measure 70 feet with a typical bucket height of 45 feet. A typical distance from the center of rotation of a shovel to the distal end of the bucket is 80 feet.

Haul truck loading tends to be a rate limiting operation in the material extraction process of a mine. Conventionally, a haul truck will back up along a path that is perpendicular to a face to a position on one side of the shovel. Once the truck is in position beside the shovel, the shovel operator will retrieve material from the face and load the truck. Once loaded, the truck proceeds to a crusher. Given the size and responsiveness of a conventional mine truck, the process of navigating a truck into a desired position can take some time. Additionally, a collision between a mine haul truck and a shovel or other mining equipment can be catastrophic resulting in not only injury or death, but in millions of dollars in equipment damage and downtime. Accordingly, mine-haul truck drivers tend to be tentative when moving their vehicles into position for loading, further reducing the vehicle's efficiency.

Ideally, as a first truck is being loaded on a first side of a shovel, a second truck will move into position on the other side. This maximizes the use of the shovel, allowing it to be continuously engaged in the loading operation, rather than waiting for the next truck to move into position.

FIG. 1 shows a conventional solution for assisting a mine-haul truck to navigate into a loading area besides a shovel. In the arrangement of FIG. 1, power shovel 105 is working at a mine face 102. Power shovel 105 includes lower assembly 110. Lower assembly 110 includes first and second crawler tread 115a, and 115b. Power shovel 105 includes an upper assembly 120, which is rotationally coupled to lower assembly 110 via a rotational bearing 125. Upper assembly 120 includes boom 127. Attached to boom 127 at a hinge is a handle 130. At a distal end of handle 130 is a bucket 135. Upper assembly 120 also includes a cab 140 in which an operator of power shovel 105 resides. In the example operation shown in FIG. 1, power shovel 105 is electrically powered via dragline tether 145 which provides electrical energy to shovel 105. Other shovels, such as hydraulic shovels, may not be powered via a dragline tether or power cable and instead can operate independently. In either case, the upper assembly of a shovel often presents a large structure extending rearwards away from the shovel's cab. As the shovel rotates, both the boom and rear portion of the upper assembly can pose a hazard to nearby objects as it rotates about the shovel's rotational bearing. Because the shovel and upper assembly must enclose additional power generation machinery, the upper assembly of a hydraulic digger that does not rely on a dragline for power generally extends further in a rearward direction from the shovel's cab.

The conventional arrangement of FIG. 1 shows a first mine haul truck 150 in position to receive material from shovel 105. During the loading of first haul truck 150, however, shovel 105 is rotating back and forth between the first loading position and the face 102. As such, second haul truck 165, which would otherwise be positioned on the opposite side of power shovel 105 from first haul truck 150, must keep clear of the arc of the tale and corners of the upper assembly 120 while loading is occurring at the first loading position. The dangers inherent in backing a haul truck up to an operating shovel often cause truck operators to delay moving into position until the bucket of the shovel is already positioned over the second loading position. This results in wasteful downtime.

The conventional solution to this problem is to attach a boom 155 ending in a highly visible marker 160 to the tail of the shovel 105. Occasionally, power line markers or traffic cones are used for the highly visible marker 160. Conventionally, the operator of the second truck 165 will use the highly visible marker 160 to align the second truck 165 while the first truck is being loaded. After loading of the first truck 150 is complete, and the shovel rotates the bucket back to the face 102 to pick up more material, the second truck 165 backs into position.

Systems have been developed that track the location of mine haul trucks with respect to potential hazards. For example, co-owned U.S. Patent Application Publication No. 2009/0062971 discloses a GPS based system for defining routes and potential hazards in a mining environment. Co-owned U.S. Pat. No. 6,799,100 discloses a permission system for controlling interaction between autonomous vehicles in a mining environment, U.S. Pat. No. 6,487,500 B2 to Lemelson et al., describes a system that uses GPS systems on vehicles, augmented by more accurate position sensors, to alert a vehicle operator of hazards in the operator's vicinity, including other vehicles. U.S. Pat. No. 7,047,114 B1 to Rogers et al., describes a hazard warning system for marine vessels. The Rogers system takes GPS position and data information from marine vessels and forwards that information to those vessels hazard alerts based on the positions of other vessels as well as fixed and semi-fixed hazards derived from nautical charts.

SUMMARY OF THE INVENTION

Embodiments of the invention provide for using GPS and other geolocation technology to guide operators of mine haul trucks into position at a mining facility. Specifically, embodiments of the invention use position tracking and guidance systems to assist an operator of a mining vehicle, or to control directly an autonomous vehicle, in positioning a vehicle at a predetermined location with respect to another mining vehicle or a particular geographical feature.

In one implementation, the present invention is a system for navigating a haul truck through a mining environment to a target destination associated with a shovel. The target destination is located within a loading area proximate the shovel. The system includes a distributed objects database storing information describing hazards, boundaries and target destinations within the mining environment, and a position sensor configured to identify a position and an orientation of the haul truck. The position sensor is mounted to the haul truck. The system includes a navigation aid configured to retrieve a location of the target destination associated with the shovel from the distributed objects database, wherein the location of the target destination is at least partially determined by a position of the shovel, and at least one of a tail drag radius of the shovel, a corner drag radius of the shovel, and a boom radius of the shovel. The navigation aid is configured to calculate a path from a current position of the haul truck to the location of the target destination. The calculated path is selected to avoid hazards within the mining environment. The navigation aid is configured to use the position sensor to monitor a progress of the haul truck along the calculated path. The system includes a user interface configured to display at least a portion of the calculated path to an operator of the haul truck.

In another implementation, the present invention includes a method for navigating a first heavy equipment to a target destination. The method includes retrieving a location of the target destination from a distributed objects database. The location of the target destination is at least partially determined by a position of a second heavy equipment. The method includes using a position sensor to identify a current position and orientation of the first heavy equipment, and calculating a path from the current position of the first heavy equipment to the location of the target destination. The calculated path is selected to avoid hazards. The method includes monitoring a progress of the first heavy equipment along the calculated path using the position sensor, and, when the first heavy equipment deviates from the calculated path, outputting a message to an operator of at least one of the first heavy equipment and the second heavy equipment.

In another implementation, the present invention includes a method for navigating a haul truck into a loading area. The method includes providing a heavy equipment location, and, on the basis of the heavy equipment location, defining at least a first and a second loading envelope in a distributed objects database. The method includes navigating the haul truck into one of the first and second loading envelope.

Embodiments of the invention have a number of advantages. Embodiments of the invention use existing route definition and navigation systems to guide mine-haul truck operators into position with more speed and confidence than is provided by prior art ad-hoc spotting techniques. This allows for maximum utilization of power shovel time, allowing continuous loading under systems according to the invention. In various embodiments according to the invention, power shovels need not reposition themselves or wait for a haul truck to get into position. Additionally, haul trucks can be guided along routes that are free from hazards.

Other advantages and features of the invention will be apparent to those having ordinary skill in the art upon reading the following detailed description and claims.

DETAILED DESCRIPTION OF THE INVENTION

Figure 1:
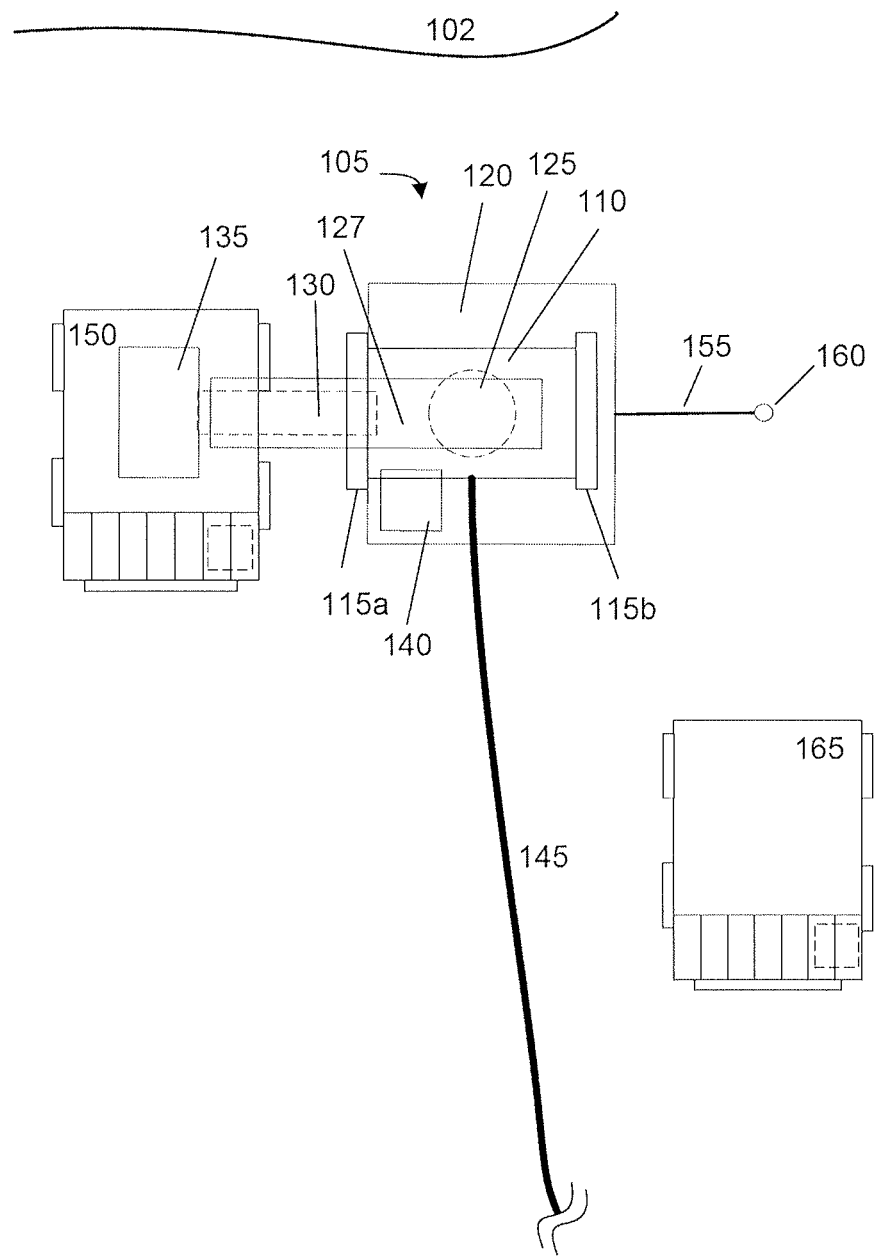
FIG. 1 is a diagram illustrating a conventional arrangement for guiding haul trucks into a loading position.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation, a magnetic disk, magnetic tape, and the like. In certain embodiments, the information storage medium comprises an optical information storage medium, such as and without limitation, a CD, DVD (Digital Versatile Disk), HD-DVD (High Definition DVD), BD (Blue-Ray Disk) and the like. In certain embodiments, the information storage medium comprises an electronic information storage medium, such as and without limitation, a PROM, EPROM, EEPROM, Flash PROM, compactflash, smartmedia, and the like. In certain embodiments, the information storage medium comprises a holographic information storage medium.

Reference is made throughout this specification to "signals." Signals can be any time varying electromagnetic waveform, whether or not encoded with recoverable information. Signals, within the scope of this specification, can be modulated, or not, according to any modulation or encoding scheme. Additionally, any Fourier component of a signal, or combination of Fourier components, should be considered itself a signal as that term is used throughout this specification.

The present system facilitates the navigation of a mining vehicle or other heavy equipment such as a haul truck, shovel, dozer, or excavator to a desired target destination. The system first generates a listing of target destinations. The target destinations may include static sites such as parking areas or repair facilities. In other cases, the targets are moveable as they may be defined by changing geographical features or may be defined by the position of another vehicle. An operator of the vehicle selects the intended target destination and the present system calculates a most appropriate path to the target destination. In other implementations, a supervisory controller selects the intended target. The supervisory controller may be implemented via an automated decision-making software system or an individual acting in a supervisory capacity. The path is selected to optimize efficiency for navigating the vehicle to the target destination, but can also be optimized for safety. In other implementations, the path may also be optimized for various factors defined on a case-by-case basis. Other factors, for example, could include operator experience, operator training requirements, or other characteristics of the operator or the vehicle. After determining the path, the present system generates a display or other output that demonstrates the path to the vehicle operator. As the vehicle navigates along the path, the present system provides constant feedback to ensure the operator is following the selected path.

Figure 2:
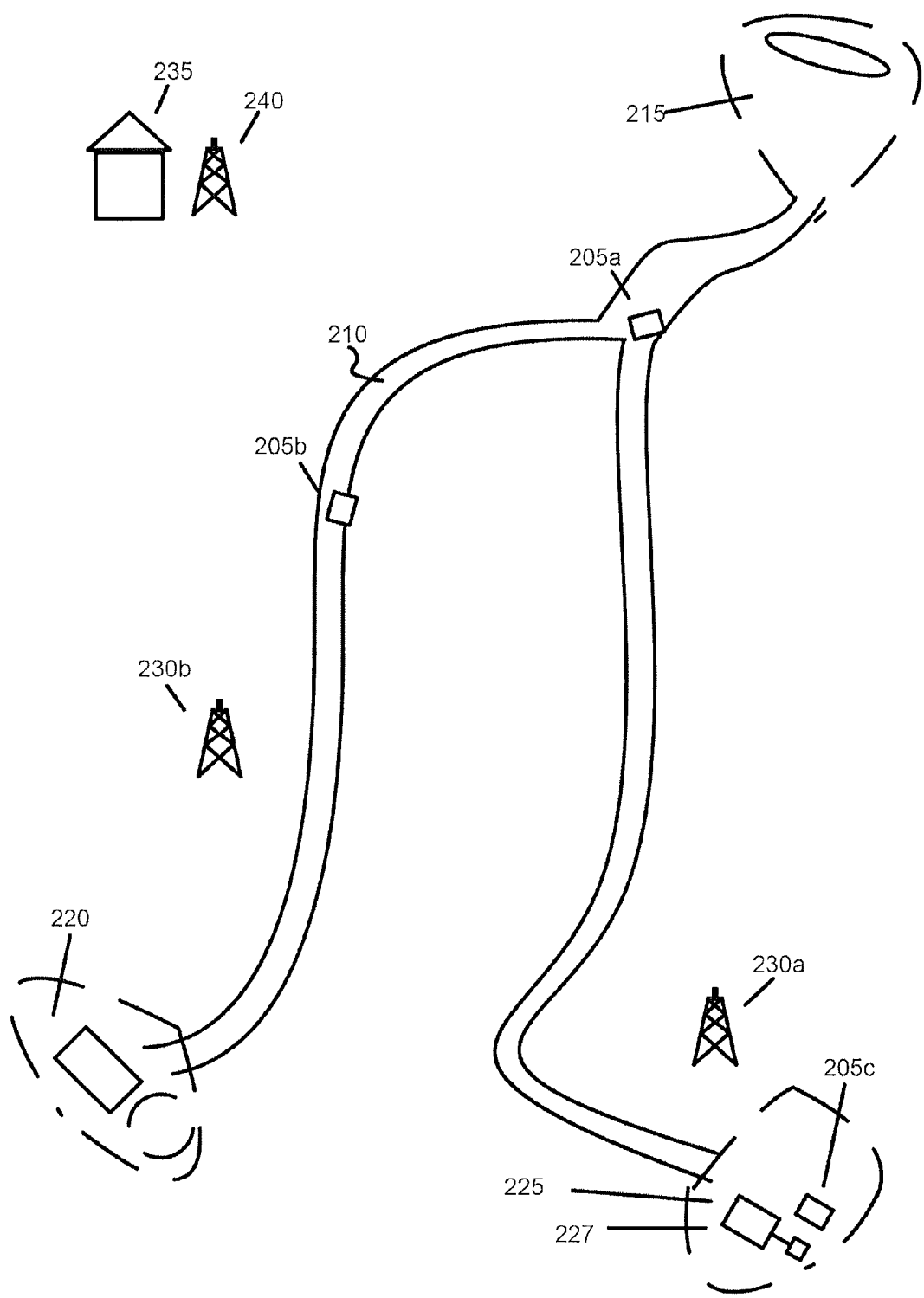
FIG. 2 is a schematic diagram of an open pit mining environment with a networked data collection and transmission system according to an embodiment of the invention.

FIG. 2 is an illustration of an open pit mining environment where systems and methods according to embodiments of the invention are implemented. In the environment of FIG. 2, a plurality of mine haul trucks 205a-c operate on a mine haul route network 210. Mine haul trucks 205a-c perform hauling tasks, for example, by moving material between a shovel site 225 a crusher site 220 and a dump or stockpile site 215.

Each mine haul truck 205a-c is equipped with an array of navigation, communication, and data gathering equipment that assist the haul truck's operator. Each mine haul truck is equipped with a mobile computing device, for example, a tablet personal computer, a personal digital assistant, or a "smart phone" for implementing the present system. The mobile computing device includes the basic functionality common to all computing devices, specifically, data processing, storage, input and output devices like displays, speakers and either dedicated or on-screen keyboards, and network communications interfaces. The mobile computing device and its functionality are discussed in greater detail below with respect to FIG. 3.

Each mine haul truck's mobile computing device is configured to receive data from a Global Positioning System receiver, which generates information about the time-varying position of the truck. Additionally, or alternatively, each mine truck's mobile computing unit receives data from a geolocation receiver, which generates information about the time-varying position of the truck based on transmissions from transmitters located terrestrially, within the mining environment. The mobile computing device may also communicate with on-board sensors such as gyroscopes or inertial navigation systems for locating the haul truck within the mine environment.

Each mine haul truck's mobile computing device operates in communication with a transceiver, which exchanges data directly with other mine haul trucks and with a mine communications network 230a, 230b, and 240. In FIG. 2, the mine communications network is represented as a collection of wireless data transceivers, such as would be suitable in implementing a WiFi 802.11g or 802.11n, WiMax, GPRS, EDGE or equivalent network. These network architecture examples, however, are not limiting.

In practice, a mine communications network is typically an ad-hoc network consisting of various wired and wireless portions. The distances over which communications may occur in a mining environment, combined with the challenging and ever-changing topography of a mine, often prevent using strictly WiFi transceivers. The wireless portions of a mine communications network may not always be implemented using contemporary standards, and may include slower legacy systems. The only requirement for a mine communications network is that it allow for, at least, the sharing of data between a central mine management computer located at a central site 235, with a plurality of mine haul trucks 205a-c. In certain embodiments, central site 235 includes a central communications node 240 and a central computing device, for example, the device discussed below with respect to FIG. 3. In certain embodiments, transceivers located at the mine haul trucks 205a-c can act as network peers and may share information with one another directly, without the need to be in direct communication with the wider mine communications network.

In the embodiment of FIG. 2, power shovel 227 has a mobile computing device in communication with the communications network over a transceiver located at power shovel 227. The mobile computing device, which performs functions similar to those performed by the mobile computing devices located at mine haul trucks 205a-c, is at least adapted to communicate the position of the power shovel 227 to a central mine management application.

Figure 3:
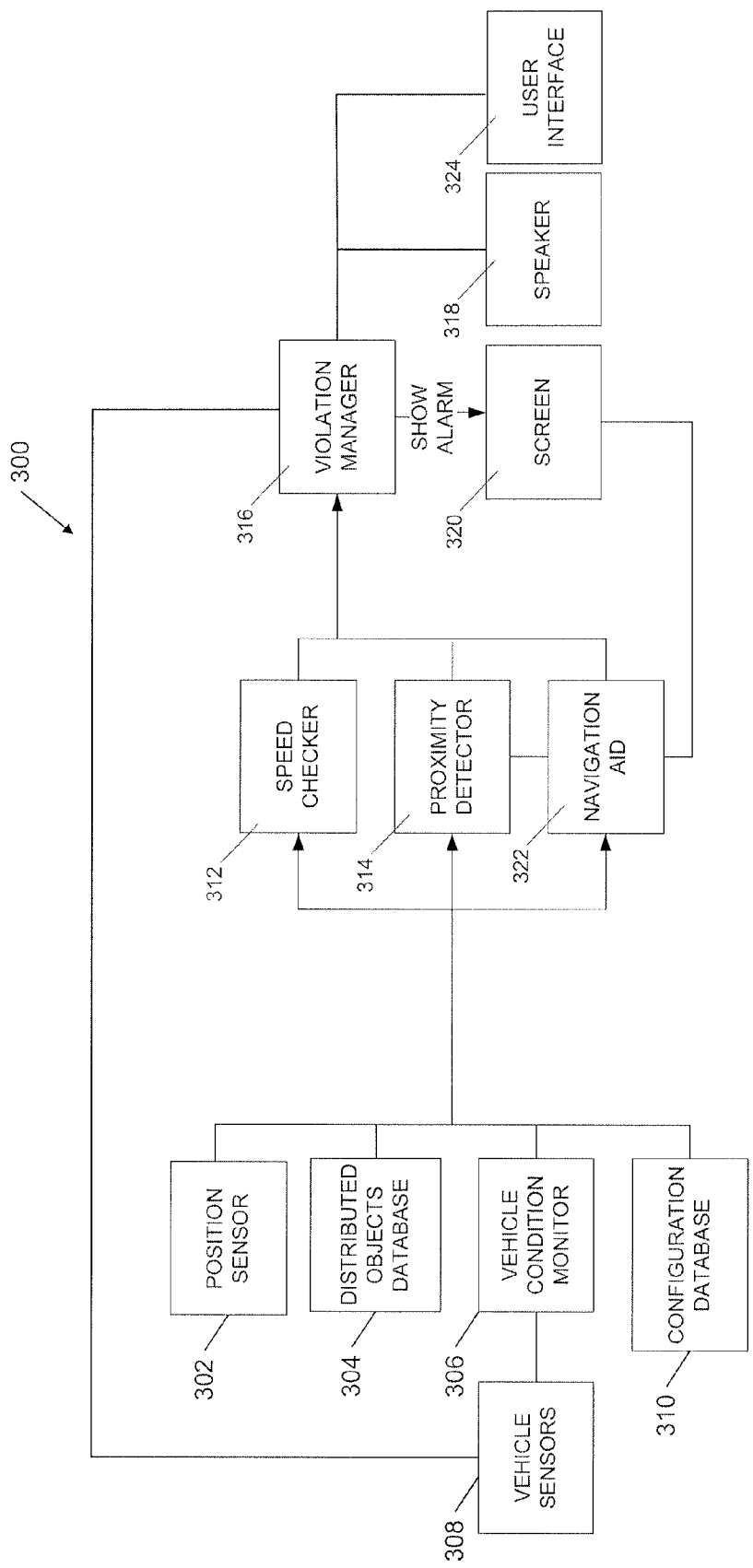
FIG. 3 is a functional block diagram showing the components of a navigation system running on a mobile computing device located at a vehicle according to an embodiment of the invention.

FIG. 3 is a diagram illustrating functional components of the present system for aiding navigation of a vehicle to a particular target destination. The system includes a number of sensors, databases (either locally accessible or accessed via a wireless electronic communications network), and processing elements. The system is configured to generate a listing of candidate target destinations for the vehicle. The target destinations may include fixed locations such as parking spaces, crusher locations, repair facilities, fueling facilities, or dump sites. The target destinations may also include movable targets, though, such as moving faces within the mining environment, moving vehicles, or moving roadways, for example. In some cases, the target destinations are themselves defined by the positions of other objects. For example, a number of target destinations may be defined around the perimeter of a shovel—for example at each side of the shovel, or may be defined based upon the position of other vehicles.

After generating the listing of candidate target destinations, a user, supervisor, or supervisory controller system selects a particular destination and, after verifying that the destination is valid, the system generates a path to the destination. The system can use characteristics of the vehicle, driver (including, for example, criteria for evaluating when the equipment has exceeded, or will exceed, its acceptable operational limits), and known hazards and boundaries within the mining environment to calculate the most appropriate path. To select a particular path, a number of candidate paths can be generated. The paths are then ranked based upon one or more criteria (e.g., safety, efficiency, or simplicity) and the best path is selected.

After selecting the best path to the selected target destination, the present system is configured to monitor a movement of the vehicle along that path and provide constant feedback to an operator of the vehicle (either human or a computer system in the case of an autonomous vehicle). The constant feedback allows for errors in the path of the vehicle to be corrected. If however, the vehicle navigates to a position where it is impossible or extremely difficult for the vehicle to return to the selected path (e.g., it would exceed the vehicle's operational limits for the vehicle to do so), the present system can be configured to abort the current path and calculate a new, replacement path to the selected destination.

One or more components of the system can be mounted within the vehicle. In various implementations, though, one or more of the systems (e.g., the various databases) may be installed at a central location of the mine where they may be updated and monitored by a central computing system. Generally, the components of the system shown in FIG. 3 may be installed directly into the heavy equipment vehicle and in direct communication with one another, or, if configured at a location away from the vehicle, the components are in wireless communication with the vehicle and components mounted therein. In other implementations, to provide redundancy, one or more of the systems illustrated in FIG. 3 may be duplicated in both the heavy equipment vehicle and an offsite location, for example, to provide redundancy.

In FIG. 3 system 300 includes a position sensor 302. The position sensor 302 detects the position of the vehicle, for example, by triangulating the vehicle's position in relation to fixed satellites, such as is known in GPS related art. The position sensor 302 might also determine the position of the vehicle by other means such as by triangulating the vehicle's position in relation to terrestrial transmitters located in a mining environment. In certain embodiments, WiFi or WiMax network transceivers with fixed, known positions may be used to provide terrestrial points of reference. The position sensor 302 optionally can use a combination of methods or systems to determine position, for example, by determining a rough position using UPS and performing error correction by terrestrial references, such as broadcasting beacons mounted in and around the mining environment or other terrestrial reference points. In alternative embodiments, position sensor 302 also takes data from conventional RFID, RADAR, optical or other proximity or collision warning systems. These conventional systems can provide a warning signal to the vehicle operator and/or the operator of equipment in proximity to the vehicle if a piece of equipment such as a mine haul truck comes within some predefined range of another piece of equipment. Position sensor 302 also includes one or more systems for determining an orientation of the vehicle. In some cases, orientation may be determined by an electronically-readable compass or other systems that uses the earth's magnetic poles to determine orientation. In other cases, the vehicle's orientation may be sensed using one or more terrestrial beacons or devices mounted in and around the mining environment. In other cases, the vehicle's orientation can be determined algorithmically, for example by tracking a movement of the vehicle over time, sensor 302 can make an accurate determination of the vehicle's orientation.

In other implementations, position sensor 302 is assisted by a number of external devices that are mounted around various objects in the mining environment to assist in determining a location and an orientation of the vehicle. For example, a number of radar, LIDAR, laser, or other object-detection systems could be installed at the entrance to a crusher bay or other equipment disposed around the mining environment. As a vehicle approaches the bay, object-detection systems can scan the entrance to the bay and communicate the results of their scan to the vehicle. The vehicle uses the information received from the externally-mounted object-detection systems to supplement the information retrieved from position sensor 302 to generate a more accurate description of the vehicle's current position and orientation. These object-detection systems can be used in any location of the mining environment, but may be particularly useful at bay entrances or at any location where a vehicle must navigate particularly accurately. These externally-mounted systems can be mounted on any equipment, features, or objects within the mining environment (e.g., shovels, buildings, crushers, etc.). The externally-mounted systems allow for peer-to-peer aggregation of vehicle and object positional data within the mining environment allowing for more accurate information that can be acquired from sensors mounted on a single vehicle. In one example externally-mounted sensor system, a particular shovel may have a mounted scanning laser to accurately determine the position of a truck relative to the shovel. The data collected by the shovel using the laser system can then be communicated to the truck. That additional data can then be used by the truck to refine its own positional data with respect to the shovel. The combination of positional data collected by the truck's sensors, as well as the shovel's sensors can then be used in navigating the truck into position beside the shovel, for example.

When interacting with externally mounted object-detection systems, the external systems may only be able to observe a small portion of the vehicle. For example, when using LIDAR, or radar for example, the systems may only be able to communicate information regarding distance from the detection system to the side of the vehicle that is being presented to the object-detection system—the other sides of the vehicle will be obscured. In that case, though, the present system can use the information received from the object-detection system (including the location of the object-detection system itself) to supplement data retrieved from position sensor 302.

System 300 includes a number of databases storing information useful in providing the functionality of the present disclosure. Distributed objects database 304 stores a listing of objects that are present within the mining environment. Distributed objects database 304 can store listings of candidate target destinations (where each object in the database may be a target), the position of vehicles and hazards or boundaries within the mining environment. Additional objects stored in distributed objects database 304 can include roadways, parking areas, repair facilities, buildings or structures, dumping areas, or power lines.

For each object, distributed objects database 304 can store, in addition to the location information for each object, additional descriptive information that identifies characteristics of the object. For example, in the case of vehicles, the database can store information describing the type of vehicle, its size and capacity, its current status (e.g., loaded or unloaded, in use or not in use, etc.), weight, and velocity. For each vehicle, the database may also store information describing the operator of the vehicle (e.g., the operator's experience level, current assignment, shift status, etc.). In the case of hazards, the database can store information describing the severity of the hazards and may define a number of hazard zones around each hazard. In fact, for each object, the database may define a number of hazard zones around the object, with each zone (e.g., a circular area defined around the hazard) representing a different degree of danger. The database can also store information describing roadways and boundaries of the mining environment. In the case of roadways, the database can store information describing a weight limit for vehicles traversing the roadway. Additional information such as slope, consistency, and speed limit can be stored.

In some cases, the objects defined within distributed objects database 304 vary over time. Because the mining environment is constantly being modified by the mining operations, nearly all objects within distributed objects database 304 can change over time. Accordingly, to ensure that database 304 contains up-to-date information, the contents may be periodically refreshed via a connection to a central computer system that monitors the position and status of objects within the mine environment. Accordingly, whether distributed objects database 304 is based in the vehicle, a central computer system, or a combination of both, distributed objects database 304 is configured to be constantly updated. Updates to distributed objects database 304 are distributed efficiently and the database reflects the known objects within the mining environment at any point in time.

System 300 also includes vehicle condition monitor 306. Vehicle condition monitor 306 is configured to monitor one or more systems within the vehicle and determine a current status or condition of those systems. In some cases, vehicle condition monitor 306 communicates with one or more vehicle sensor 308 mounted in and around the vehicle to determine the current status of those systems. For example, vehicle condition monitor 306 may monitor a current status of the vehicle's fuel level or fuel status, wheel positions (e.g., in two-wheel or four-wheel configurations, the angle of the wheels can be measured), current selected gear (e.g., forward or backward gears), braking status, etc. Vehicle condition monitor 306 can also determine whether the vehicle is carrying a load or whether the vehicle is empty. Vehicle condition monitor 306 can also track a current speed of the vehicle. When the vehicle includes sensors for monitoring a health level of various components of the vehicle (e.g., engine temperature, tire pressure, battery charge levels), vehicle condition monitor 306 can also communicate with those sensors to identify the current status of the connected systems.

System 300 also includes configuration database 310. Configuration database 310 stores information describing certain vehicle attributes or conditions that are to be met before the vehicle can undertake a particular maneuver. For example, configuration database 310 may store a set of conditions that must be met before the vehicle can navigate to a particular target destination. Example conditions include that the vehicle be in a forward gear, that any emergency braking systems be disengaged, that the vehicle have sufficient fuel to complete a particular journey, that the vehicle not be scheduled for emergency maintenance that the vehicle must undergo before the navigation can occur, etc. The set of conditions included in configuration database 310 can be different based upon the vehicle and the particular maneuver the vehicle is attempting to undertake. Additional maneuvers may include dumping material, for which configuration database 310 would include a condition that the vehicle be carrying sufficient material to warrant dumping. As another example, before attempting a re-fueling maneuver, configuration database 310 may specify a condition that requires the vehicle to have less than a particular amount of fuel reserves available.

The remote application 300 includes a number of modules that act on data received from one or more of position sensor 302, distributed objects database 304, vehicle condition monitor 306, and configuration database 310.

The remote application 300 includes navigation aid 322 that is configured to one or more of position sensor 302, distributed objects database 304, vehicle condition monitor 306, and configuration database 310 to assist an operator of the vehicle to navigate to a particular target destination. To begin a navigation maneuver, navigation aid 322 is configured to access position sensor 302 and distributed objects database 304 to identify a listing of potential target destinations. The list of potential targets can be filtered by navigation aid 322 on a number of variables. For example, the listing can be ordered based upon proximity to the vehicle, with targets that are over a threshold distance away being filtered out. Also, based upon various attributes of the vehicle (the attributes can be retrieved from vehicle condition monitor 306 and/or distributed objects database 304) the targets can be filtered. If, for example the vehicle is a shovel, then targets that are only useful to haul trucks can be filtered out. Conversely, if the vehicle is a haul truck, only targets useful to haul trucks are used. Additionally, if the haul truck is fully loaded, for example, only targets that are useful to fully loaded haul trucks are included in the listing of potential targets.

After identifying the listing of potential targets, navigation aid 322 can display the listing via screen 320. A user interface (e.g., a touch screen, keyboard, voice input, or other user input system) allows an operator of the vehicle to select one of the targets. In other implementations, an automated system selects the target automatically and the selected target is displayed via the user interface.

After a particular target destination is selected, navigation aid 322 uses position sensor 302, distributed objects database 304, vehicle condition monitor 306 and configuration database 310 to identify a best path for the vehicle to follow in order to maneuver into position at the target.

After identifying a best path, navigation aid 322 verifies that the vehicle can begin moving using vehicle condition monitor 306 and configuration database 310. If so, navigation aid 322 constantly monitors the current position of the vehicle with respect to the selected path using position sensor 302. Using the vehicle's current position and orientation, navigation aid 322 uses screen 320 to provide feedback to the vehicle operator to assist the operator in maneuvering the vehicle along the selected path. As the vehicle begins to deviate from the selected path, for example, navigation aid 322 may use screen 320 to provide feedback to the operator instructing the operator to turn the vehicle to return to the selected path. Alternatively, feedback could be provided via other user interfaces 324. For example, navigation instruction could be provided by the vehicle's rear view mirrors. A number of light sources (e.g., LEDs) may be disposed around the housing of the rear view mirror. By illuminating various combinations or colors of the light sources, the vehicle operator can be instructed to maintain the current course, steer to the left by a small degree, steer to the right by a small degree, steer to the left by a large degree, or steer to the right by a large degree. The light sources may also indicate when no alignment with a defined route or path is possible. In other implementations, user interface 324 could include a heads-up display or virtual reality output for displaying a particular path, route, or other information for the vehicle operator. Additionally, voice instruction could assist an operator in navigating a particular path.

In one implementation, navigation aid 322 uses screen 320 to display a roadmap illustrating the area in proximity to the vehicle. The map can be supplemented to display various objects that are described in distributed objects database 304. For example, screen 320 could depict the movements of other vehicles, the position of hazards as well as hazard zones defined around each hazard, roadways and various boundaries defined within and surrounding the mine environment. The roadmap representation can include any appropriate geographical features such as acceptable routes, route attributes, hazards, out-of-bounds areas and the location of points of interest, for example, individual work sites or pieces of equipment. Navigation aid 322 can optionally use screen 320 to display overhead imaging data generated, for example, by satellite or aerial photography that is scaled and oriented to be co-extensive with the representation of the roadmap system and stored within distributed objects database 304, or another suitable data storage system.

Navigation aid 322 uses screen 320 to display the location of the vehicle on the visual representation of the roadmap system, overlaid on overhead imaging data on screen 320. A graphical user interface (GUI), not shown, allows a user to alter the scale and orientation of the visual representation of the roadmap system and plot acceptable routes between the current location of the remote vehicle and predefined points of interest.

Figure 5:
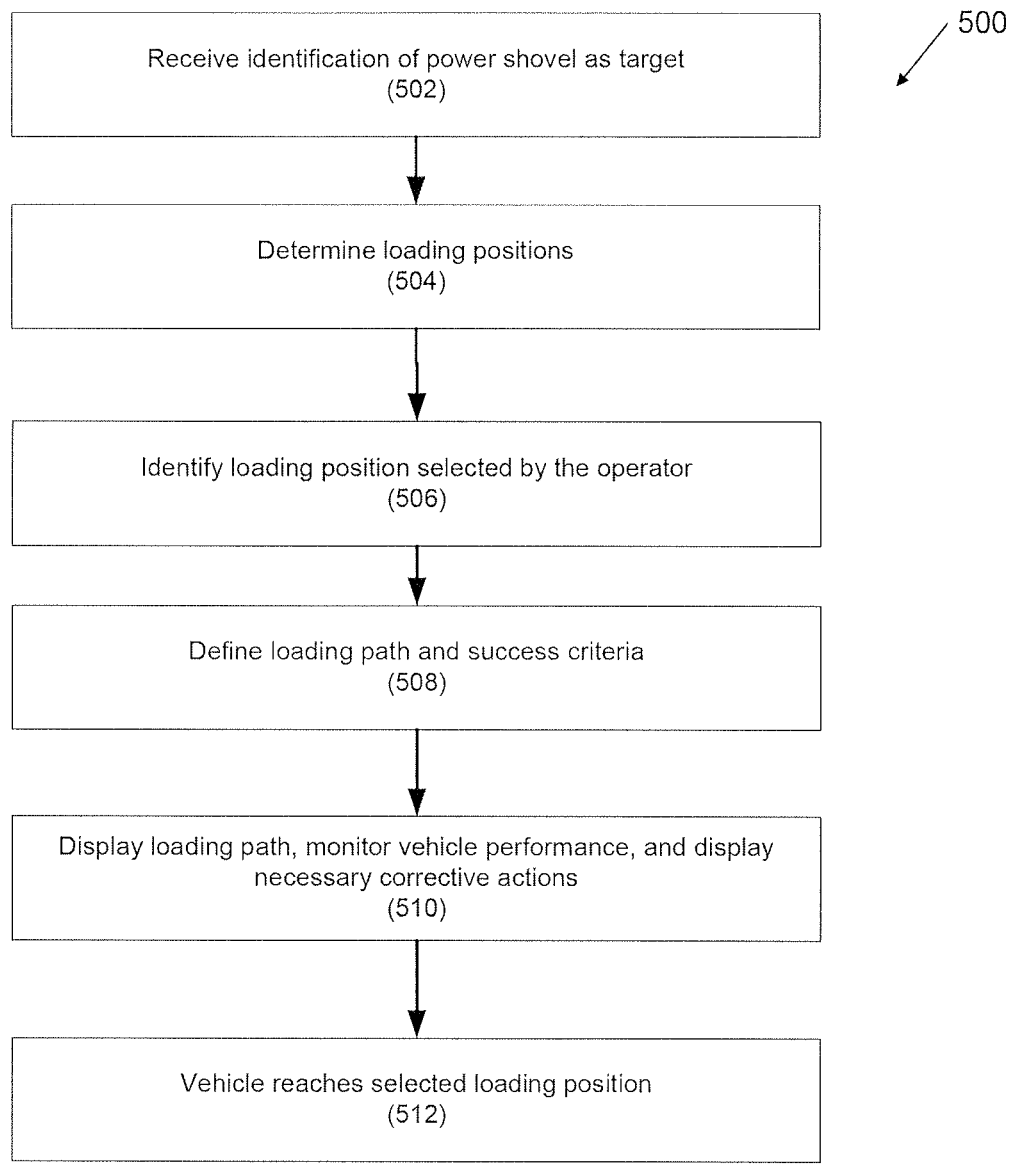
FIG. 5 is a flow chart illustrating an example method for navigating a vehicle to a target destination according to an embodiment of the invention.
Figure 6:
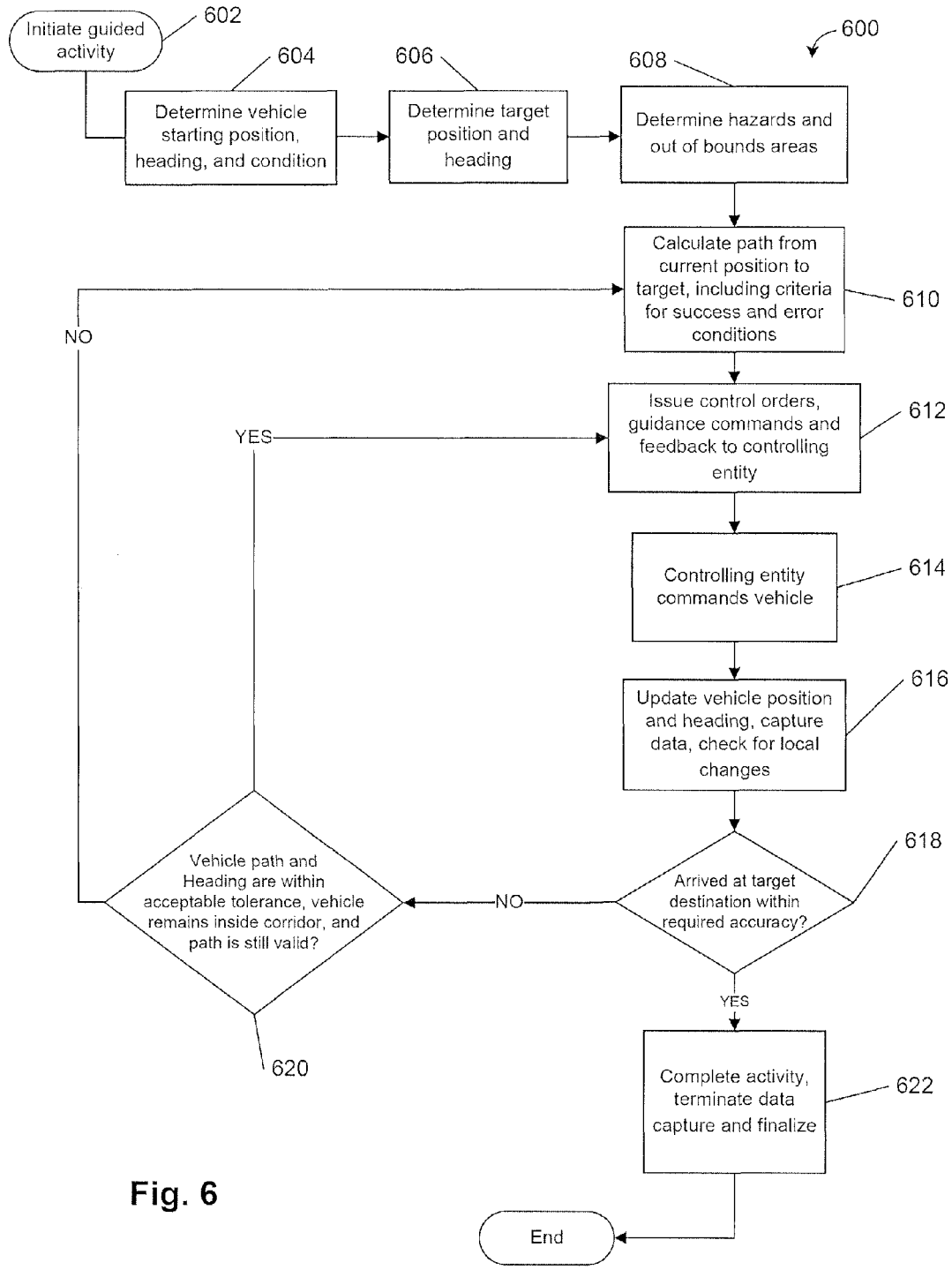
FIG. 6 is a flow chart illustrating steps of an alternative method for navigating a mining vehicle to a destination in accordance with the present disclosure.

In one implementation, navigation aid 322 is configured to operate in accordance with the methods illustrated in FIG. 5 or FIG. 6, for example.

System 300 may also include speed checker 312. Speed checker 312 is configured to check the speed of the vehicle against an allowable speed retrieved from distributed objects database 304 for the vehicle's current position (determined by position sensor 302). Speed checker 312 can calculate the vehicle's speed using GPS or other data received from the position sensor or might read the vehicle's speed directly from the vehicle.

System 300 may also include proximity detector 314 that checks the vehicle's position against the location of objects defined in distributed objects database 304. The vehicle's position is typically checked against objects such as, for example, defined hazards, other vehicles, areas that have been defined as out-of-bounds or not on a defined route, or areas that are on a defined route but that only permit a particular direction of travel. In some cases, proximity detector 314 compares the vehicle's current position to a number of hazard zones that are defined around a particular object. Depending upon which (if any) hazard zones the vehicle currently occupies, proximity detector 314 can cause different levels of alarm to be sounded for the operator of the vehicle.

Information from the speed tracker 312, proximity detector 314, and one or more of vehicle sensors 308 is passed to violation manager 316. Violation manager 316 includes a rule set that compares the location and attitude of the vehicle with attributes defined in distributed objects database 304 and returns an indication if certain rules are violated. The rule set may comprise a selected route through a particular environment that has associated with it particular attributes that are inspected by violation manager 316 in view of the received sensor data. For example, the attributes may include operational tolerances of the vehicle attempting a particular maneuver. If the tolerances are to be exceeded by the vehicle as it progresses along the route, violation manager 316 detects that a rule has been violated and outputs the violation on a suitable user interface device, such as screen 320 or speaker 318. Rules within violation manager 316 can optionally govern such conditions as whether the remote vehicle has violated a speed limit associated with a particular route, whether the vehicle is proceeding in the wrong direction along a particular route, whether the remote vehicle has left a designated route, entered an off-limits area, neared a hazard, or is too close to another vehicle. Rules included in the violation manager 316 need not be Boolean. The violation manager can, for example, maintain various distances around hazards and trigger different indications as the vehicle gets closer to the hazard. Similarly, violation manager 316 can return different indications depending on how far off a designated road a vehicle has ventured.

Depending on the definition of the rule set of the violation manager 316, system 300 can take varying actions when a rule is violated. When a rule is violated, an indication can be sent from the remote vehicle to a different location, for example, a central application (not shown). When a vehicle comes too close to a predefined hazard, for example, a central office at the mine can be notified so that the event can be logged. The violation manager 316 can additionally or alternatively supply an audible alarm to a speaker 318 or a visual alarm to a screen 320 visible to the driver of the remote vehicle.

System 300 can optionally include a user messaging function to alert the vehicle operator of messages, such as instant messages or electronic mail, relayed to system 300 from a central application not shown. When a user receives a message, audible alarms can be sent to speaker 318 and visual alarms as well as a display of the message itself can be sent to screen 320.

System 300 may also optionally include a data storage module that is updated from a central application (not shown). For example, system 300 may include a database or other data storage system that stores roadmap data, overhead imaging data, or time varying data on a remote vehicle's position and/or condition. The database can be periodically updated by the central application (not shown), through a data synchronizer.

System 300 along with any necessary data storage and communications hardware can be included in a variety of known devices, for example, handheld personal data assistants (PDAs), laptop computers, or "smart" cellular telephones.

Figure 4:
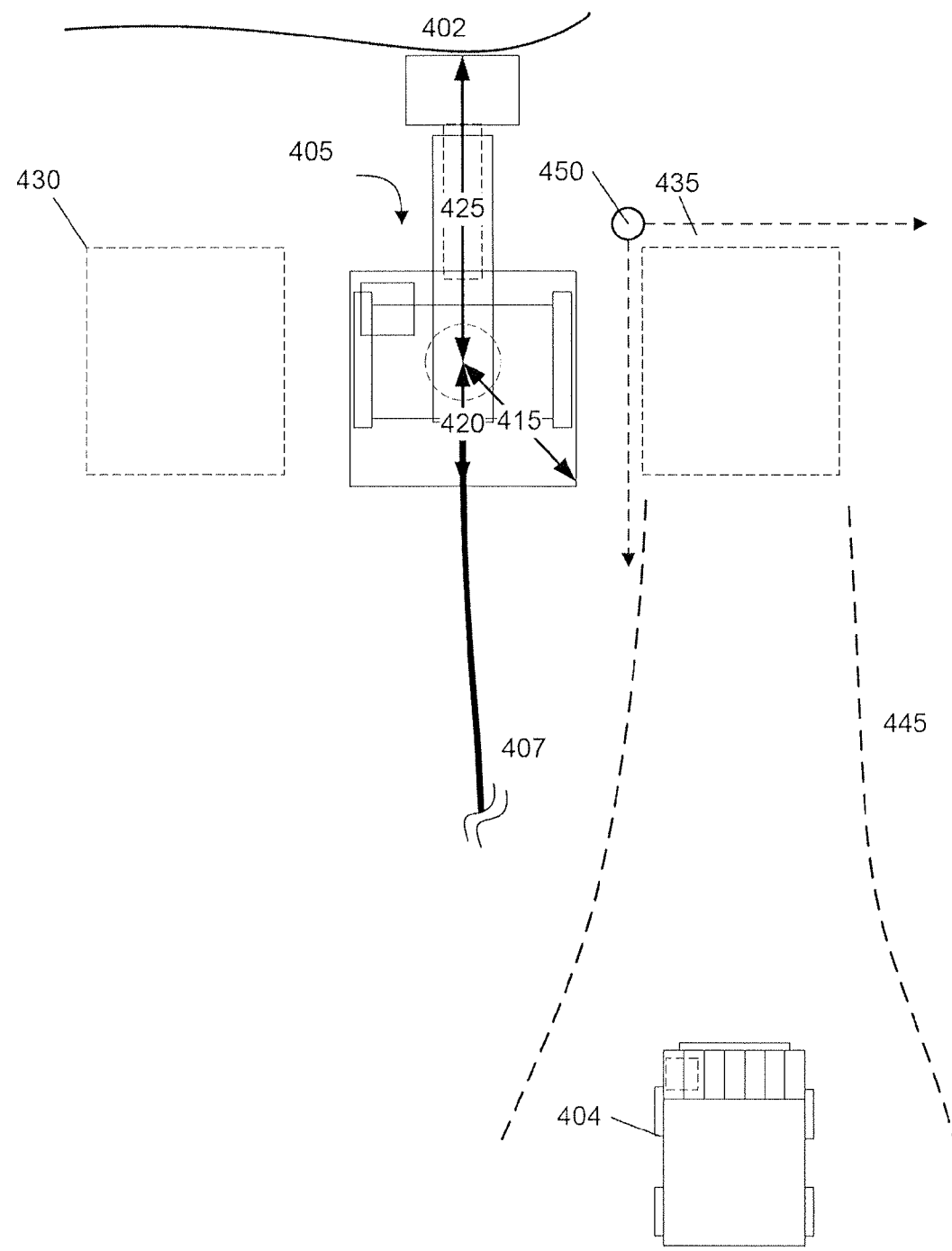
FIG. 4 is a diagram showing an example arrangement of a mine haul truck and a shovel where loading areas are arranged proximate to the shovel.

FIG. 4 shows an arrangement for navigation assistance according to an embodiment of the invention. The arrangement of FIG. 4 shows a power shovel 405 positioned at a face 402 for loading operations and depicts an implementation of the present system where a haul truck uses the navigation system to assist in positioning the haul truck at a loading position next to the shovel. In one implementation of the present system, the illustration shown in FIG. 4 is displayed by navigation aid 322 on screen 320 as shown in FIG. 3.

There are a number of shovel-related parameters of interest that are used to identify one or more loading target position around the shovel. The most significant parameter is the shovel's location that can be measured directly by a GPS receiver or calculated on the basis of known dimensions of the shovel and the location of the GPS antenna. Additional useful parameters are the tail drag radius 420, the corner drag radius 415, and the boom radius 425. These parameters set the outside envelope for the space the shovel will occupy during loading operations and can be defined in a database such as distributed objects database 304 shown in FIG. 3. These parameters are illustrated in FIG. 4 with reference to the center of rotation of the upper assembly of shovel 405.

In FIG. 4, haul truck 404 wishes to navigate to a position beside shovel 405 to receive material. Accordingly, the operator of truck 404 uses the present system to initiate a navigation maneuver. First, the present system (e.g., navigation aid 322 and screen 320 of FIG. 3) identifies two candidate target destinations, loading area 430 and loading area 435. The target destinations are displayed for the vehicle operator and the operator can select one of the target destinations to initiate the maneuver. Alternatively, a target destination could be selected automatically, or a selection may be made by another individual or vehicle operator (e.g., a dozer operator at a dump, foreman, etc.) having control authority over the vehicle.

After selecting, for example, loading area 435 as the target destination, the present system determines an appropriate path 445 that truck 404 can take to reach loading area 435. As seen in FIG. 4, the boundary of path 445 is selected to avoid cable 407 and other hazards and boundaries that should be avoided by truck 404. Additionally, although at first, the boundaries of path 445 are relatively wide, as truck 404 approaches shovel 405, the path narrows to ensure that truck 404 is safely guided into loading area 435.

To assist in navigating truck 404 into target area 435 externally mounted object-detection system 450 is mounted next to area 435. As the truck approaches area 435, the truck communicates with system 450 to retrieve additional information describing the position and orientation of truck 404. In one implementation, system 450 includes a radar or LIDAR object detection system.

As discussed below, various attributes of loading area 435 such as size, preferred direction of entry, etc., can be at least partially determined by various characteristics of truck 404.

FIG. 5 is a flow chart illustrating method 500 for navigation assistance according to an embodiment of the invention that allows a truck to enter a loading area defined next to a shovel. Method 500 is just one example method and represents a high-level summary of steps undertaken by the present system that are illustrated in more details in FIGS. 6-12.

In step 502 of method 500, a central application running on, for example, navigation aid 322 of FIG. 3 receives an identification of a shovel from which a truck wishes to receive material. Using the shovel identification, the system retrieves information describing various attributes of the shovel (e.g., tail drag radius, corner drag radius, and boom radius) and, using those attributes, identifies one or more loading areas defined around the shovel in step 504.

The candidate loading areas are provided to the vehicle operator, and in step 506 the system identifies one of the loading areas that has been selected by the operator. In step 508, after the selected loading area is identified, the system identifies an appropriate loading path that may be traveled by the vehicle to enter the selected loading area. As described below, the path is selected to avoid hazards and/or boundaries that should be avoided by the vehicle as it navigates through the mining environment. Additional criteria may be defined for assessing whether the selected path has been successfully navigated.

In step 510, the defined loading path is displayed to the operator so that the operator can begin to navigate the vehicle along the path. Also in step 510 the system continuously monitors characteristics of the vehicle (e.g., position, vehicle performance, and trajectory) to ensure that the vehicle is staying within the defined path. As the vehicle begins to deviate from the displayed path, the present system can provide feedback to the vehicle operator to assist the operator in returning to the displayed path. Accordingly, the present system continuously monitors the performance of the vehicle with respect to the defined path. In step 512, the vehicle reaches the identified loading position and the method finishes.

FIG. 6 is a flow chart illustrating the steps of method 600 for navigating a mining vehicle or other heavy equipment to a destination in accordance with the present disclosure. For several of the steps shown in FIG. 6, additional flowcharts showing an example implementation of each step are shown in FIGS. 7-12.

Method 600 may be implemented by system 300 illustrated in FIG. 3 and described above, through other portable computer systems in communication with various database and vehicle sensor systems that may also implement method 600. In some implementations, for example, the method may be executed by computer hardware residing on the heavy equipment (e.g., mining vehicle), the centralized computer system, or may be distributed across multiple systems. Method 600 uses data from multiple data sources to identify a suitable target and assist a driver or automated system to navigating the heave equipment or other mining vehicle to that target. Example data sources may be provided by, for example, the navigation system, vehicle status system, configuration database, and distributed objects database described above (e.g., distributed objects database 304, vehicle condition monitor 306, or configuration database 310). These databases may be made available by any appropriate computer system in communication with the software application executing method 600, such as software executed by navigation aid 322 of FIG. 3.

Method 600 begins by initiating the guided activity in step 602. Step 602 may involve connecting to necessary databases or systems, and powering up necessary sensors and computer systems for implementing method 600. In step 604, the vehicle's current position and heading is determined. This step may also include determining the vehicle's starting condition and verifying that the vehicle is capable of beginning a particular maneuver.

Figure 7:
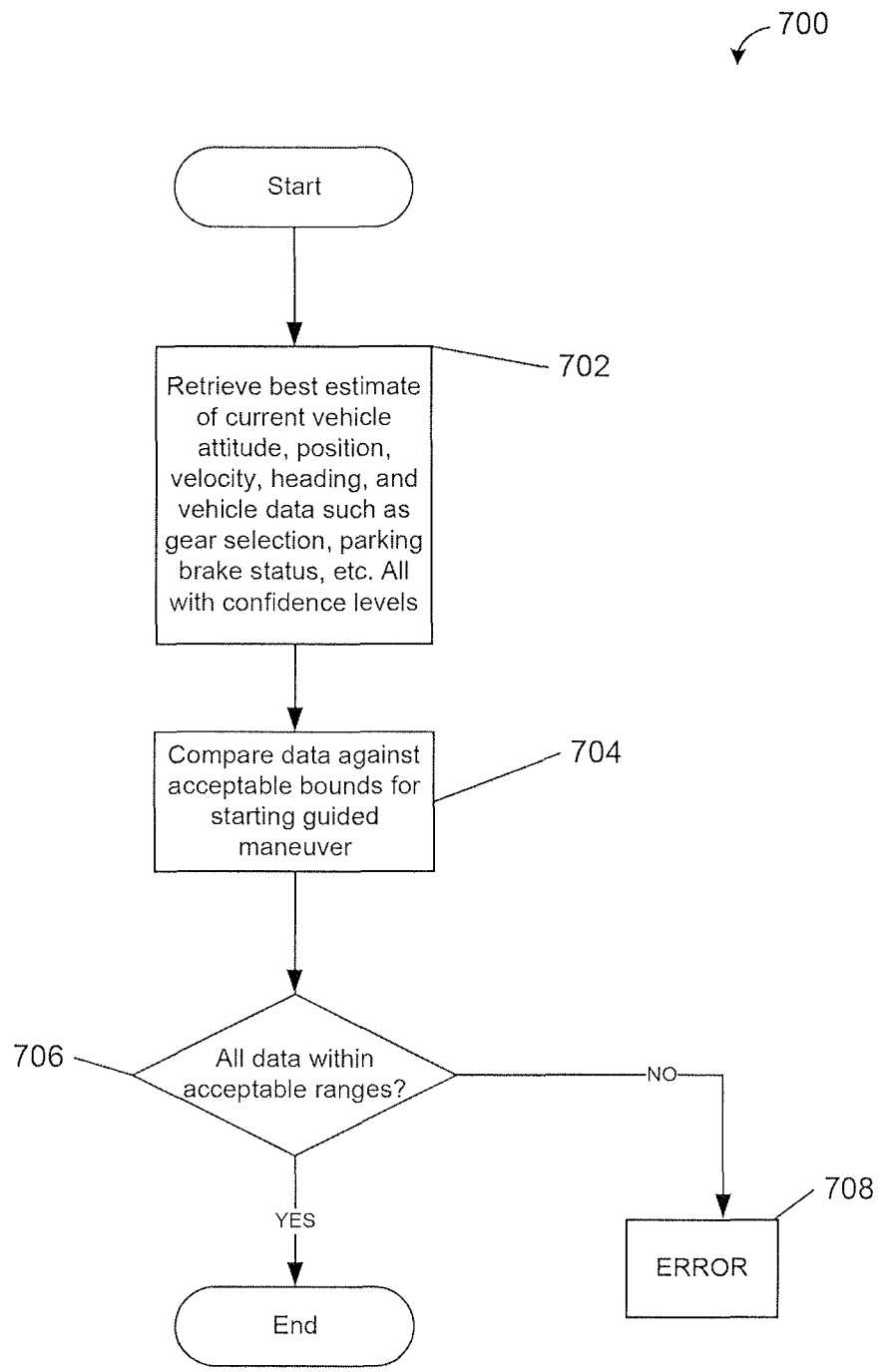
FIGS. 7-12 are flow charts illustrating additional details of various of the steps of the present method.

FIG. 7 is a flow chart showing a series of steps 700 that may be undertaken to complete step 604 of FIG. 6. In step 702 the current vehicle attitude, position, velocity, and heading are determined, for example by retrieving the corresponding data from the position sensor 302 and/or vehicle condition monitor 306 of FIG. 3. Each data point associated with the current vehicle attitude, position, velocity, and heading may be associated with a confidence level indicating an anticipated accuracy of the data. The confidence levels can then be used to determine margins of error that can be used to evaluate the safety of a particular maneuver.

In step 702, additional vehicle condition data is retrieved from a vehicle condition monitor (e.g., via vehicle condition monitor 306 of FIG. 3). The vehicle condition data may include the current gear selection, payload, parking brake status, or other information identifying a condition of the vehicle that can be useful to determine a capability of the vehicle to execute a particular maneuver. Additional information may include, for example, engine size, fuel reserves, tire or wheel types (indicating whether the vehicle is capable of traveling over particular types of terrain), maintenance or repair status (indicating, for example, whether the vehicle should avoid long distance maneuvers). The vehicle condition data may also describe the vehicle's performance characteristics such as turning radius, maximum speed, optimum speed for fuel efficient operation, maximum slope that the vehicle can climb, weight of the vehicle, or other information that is used to determine whether the vehicle can proceed along a particular path in a mining environment.

The condition data may also include condition data for the vehicle operator. If, for example, the vehicle operator is nearing the end of his or her shift, a maximum distance or time duration estimate may be established for any particular maneuver to ensure that the driver can complete the maneuver in time to go off shift.

The vehicle condition data can also include a current work assignment for the vehicle.

Given the vehicle's position and current condition status in step 704, the system uses the positional, vehicle condition, and operator condition data to determine whether the vehicle is capable of beginning a particular maneuver or by identifying a class of suitable maneuvers. The system does this by retrieving information from a configuration database (e.g., configuration database 310) that identifies attributes of suitable maneuvers that may be executed by the vehicle and/or conditions that must be met before a vehicle can begin a particular maneuver.

For example, if the vehicle is currently carrying a full (or nearly full load), the vehicle will be unable to begin any maneuvers involving the vehicle collecting additional material. As such, the set of candidate authorized maneuvers will only include maneuvers involving the vehicle dumping at least a portion of that load. Conversely, if the vehicle is empty, the set of maneuvers involving dumping material will be outside of acceptable bounds.

Additionally, if the vehicle is low on fuel, or requires immediate or urgent maintenance, the class of acceptable maneuvers may only include those that would rectify those deficiencies.

Also, the driver condition can be used to identify a class of acceptable maneuvers. If, for example, the driver is only novice, certain, more complex maneuvers may be unacceptable. Similarly, if the driver is reaching end of shift, the set of acceptable maneuvers may be limited on that basis.

The conditions may call for the vehicle being stopped or moving at a particular speed or range of speeds before a maneuver can be initiated. The conditions may also call for a parking brake to be engaged or disengaged before initiating a maneuver.

In step 706, if the vehicle positional data (e.g., position, orientation, and velocity), condition, and driver condition data are acceptable for beginning a maneuver, method 700 ends. If, however, the data are outside of acceptable ranges, the method moves to step 708 which allows an error to be displayed to an operator of the vehicle or other individuals or automated systems in communication with the present system.

Returning to FIG. 6, after collecting the vehicle position and condition data in step 604, the method determines an appropriate target position and heading in step 606. This step may involve the system retrieving a list of appropriate targets based upon the data collected in step 604 and allowing the vehicle operator to select one of those targets. Because any particular mine environment may include a large number of targets, the listing generated by step 606 can be filtered based upon the data retrieved in step 604. For example, the list of targets will only include targets that are within a certain distance, and compatible with the current orientation of the vehicle as well as the vehicle and the driver's current condition.

Figure 8:
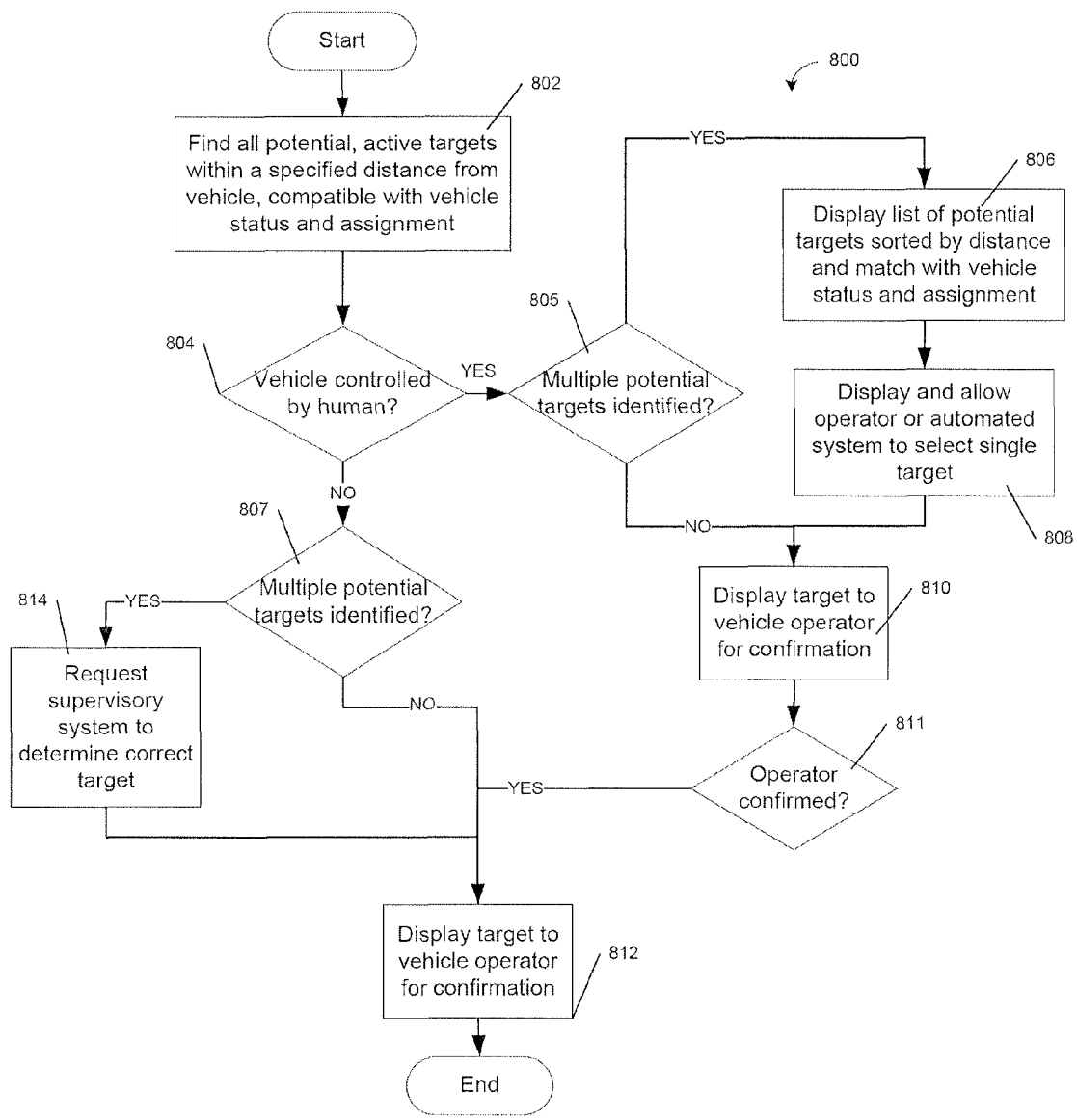

FIG. 8 is a flow chart showing a series of steps 800 that may be undertaken to complete step 606 of FIG. 6. In step 802, a listing of potential targets is retrieved from the distributed objects database (e.g., distributed objects database 304 of FIG. 3). Because a mine may have many hundreds (or thousands) of potential targets, the listing of candidate targets is filtered based upon the vehicle position and condition data, as well as the operation condition data retrieved in step 604 of FIG. 6. The listing can also be filtered based upon the distance of the target from the vehicle as well as the vehicle's current job assignment or vehicle capabilities.

As discussed above, the candidate targets may include static geographic features within the mine such as bays at a repair facility, bays at a crusher, parking areas, or dumping sites. In some cases, though, the targets are moveable. For example, in a listing of targets that may be accessed by a shovel, the targets may include mining faces or other locations where the shovel can dig material. In that case, the target, although moving slowly, is moveable.

In other cases, the targets locations can be determined by the location of a particular vehicle which is itself moveable. For example, when a haul truck needs to receive material from a shovel, there may be several candidate target destinations located around that shovel. For example, as shown in FIG. 4, most shovels will have at least two targets located about them, one on either side of the shovel. Other vehicles, such as larger shovels, may provide for more than two targets for a haul truck.

When retrieving the list of candidate targets from the distributed objects database, the distributed objects database may filter the list of targets based on their availability. For example, if the distributed objects database defines two targets about a shovel, but one of the targets is currently occupied by another haul truck, the distributed objects database would not return that target as a candidate target. Similarly, if one or more bays at a crusher are down for repair, they would not be included in the list of candidate targets. Or, if some bays of the crusher are preferred over others (for example, to balance wear and tear on the crusher or to even the flow of material through the crusher), particular bays may be preferred over others, with the unpreferred bays being filtered out.

In some cases, where the targets include a number of bays at a crusher, the targets can be filtered based upon a material being carried by the vehicle. For example, by analyzing a position of the vehicle at which it picked up material from a shovel, the type of material being carried by the vehicle can be characterized by determining the type of material being mined at that location. Alternatively, the type of material being mined by the haul truck can be indicated as part of that truck's assignment. The particular assignment can then be retrieved by the present system to identify potential dumping targets based upon that assignment. Based upon that characterization of the truck's load, particular bays at a crusher can be filtered from the target list to ensure that the material is being supplied to the most appropriate bay or bays at the crusher.

Information regarding whether a particular target is available, or is otherwise occupied, can be retrieved from the mine's central computer system, for example, or can be updated within the distributed objects database.

Having retrieved the listing of candidate targets from the distributed objects database, the present system compares the listing of candidate targets to the vehicle positional and condition data as well as the vehicle operator's condition data. Based upon that comparison, the list of candidate targets is further refined. For example, targets that are beyond a maximum distance away, or are irrelevant based upon the vehicle's current assignment are filtered out. Similarly, targets that would require too much skill for an untrained driver are filtered out if the driver does not have sufficient experience. Similarly, targets that would require too much time to navigate too are filtered out if there is insufficient time left in the driver's shift to reach such a destination.

The candidate targets may also be filtered based upon the current condition of the vehicle. If the vehicle has no current scheduled maintenance, targets relating to maintenance facilities can be filtered out. Also, targets can be filtered based upon whether the vehicle is configured to take on more material, or needs to dump some material. Additionally, if the vehicle is in need of fuel, targets that include fueling stations may be included in the list of candidate targets, where they would ordinarily be filtered out.

In step 804, the system determines whether the vehicle is controlled by a human or is automated. If controlled by a human, and the filtered listing of candidate targets generated in step 802 contains multiple entries, (evaluated in step 805) the listing is displayed for the operator in step 806 (e.g., via screen 320 of FIG. 3). In one implementation, the listing is filtered by distance and how well the target matches suitable uses for the vehicle and its current assignment. An automated system or the operator of the vehicle can then select one of the targets in step 808. The vehicle operator may use an appropriate user interface of the system to make the target selection.

In some cases, after executing step 808, the target selected by the operator is communicated to a mine supervisor for additional authorization. For example, the selection may be communicated to the mine's central computer system where the selection is displayed for a supervisor. The selection can then be evaluated by the supervisor and the supervisor can approve or deny the selection. If approved, the method would then move onto step 810. If, however, the supervisor denies approval, the method would return to step 806 and the operator can select another target.

In step 810, the target selected by the operator is displayed for the operator's confirmation. If, the operator does not confirm the selection (evaluated in step 811), then the system may generate an error, or can return to step 806. If, however, the operator does confirm the selection, the method moves to step 812. In some implementations, to minimize target selection time, the steps requiring operator confirmation are skipped by the system. Additionally, in some implementations the confirmation step illustrated by block 810 of FIG. 8 is removed from the system and after completion of step 808, the system moves straight to step 812.

Returning to step 804, if the vehicle is autonomously controlled, and multiple filtered targets were generated in step 802 (evaluated in step 807), the system moves to step 814. In step 814, a supervisor (e.g., an individual and/or automated system) reviews the list of targets generated in step 802 and selects the most appropriate target for the autonomous vehicle. The supervisor can be a human, or, in some cases, an automated mine supervisor system. The automated system evaluates the target listing in view of the other activities of other vehicles operating in the mine and automatically selects the most appropriate target. If only a single target was generated, though, the system selects that target and moves to step 812 (in some implementations, this single target would also require approval by a supervisor). In step 812, the position and heading of the selected target is determined and the target is displayed to the vehicle operator for confirmation. The system may also then verify that any parameters associated with the selected target fall with acceptable, predefined ranges.

Figure 9:
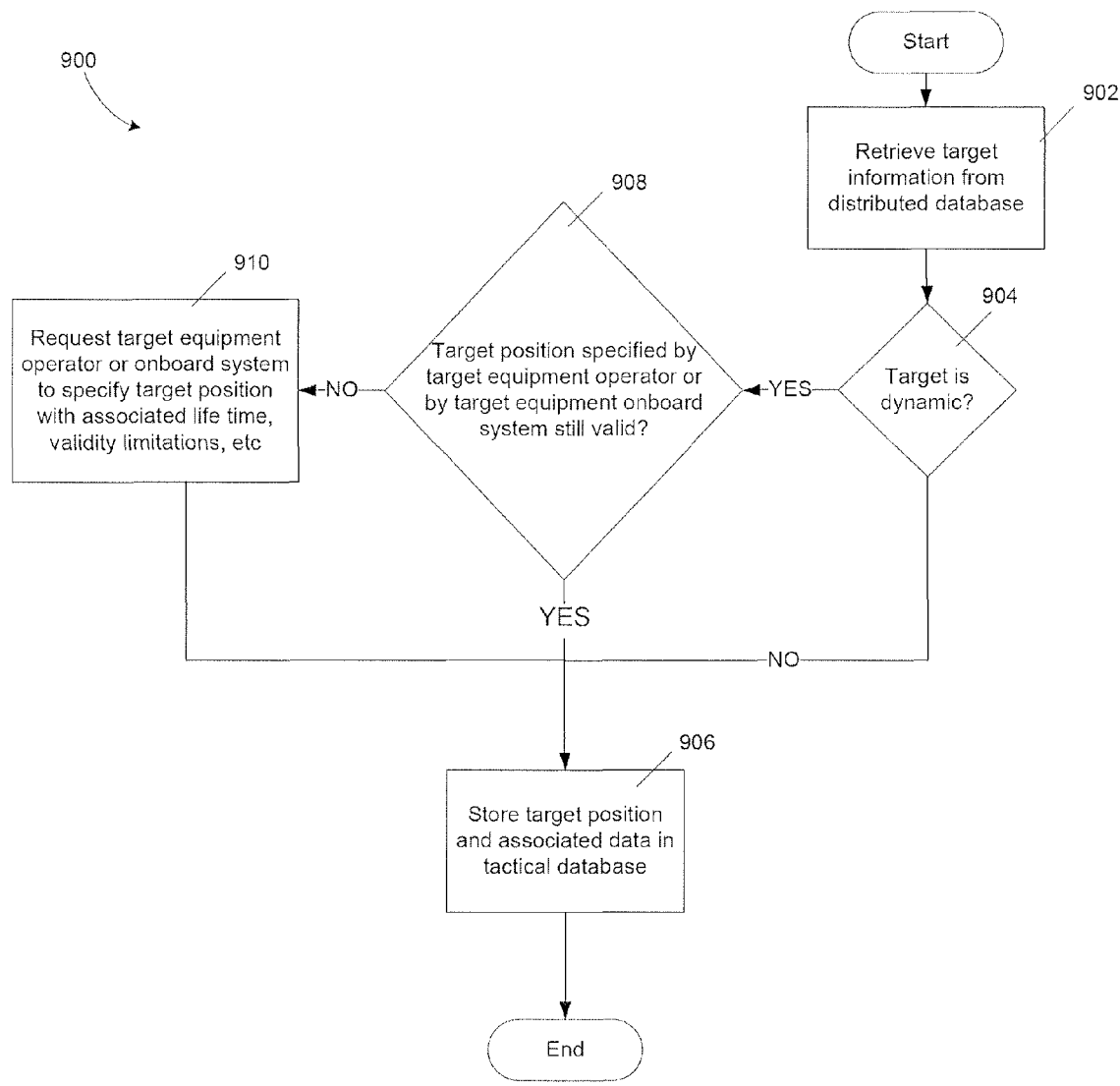

FIG. 9 is a flow chart showing a series of steps 900 that may be undertaken to complete step 802 of FIG. 8. In step 902, based upon the selected target, information describing the selected target is retrieved from the distributed objects database. The target information may include whether the target is static or dynamic.

In step 904, the system evaluates whether the target is static or dynamic (i.e., capable of moving in a relatively short time frame). If static (e.g., a crusher bay, fuel bay, predetermined parking spot, or predetermined dump spot), in step 906, the system stores target position and associated data in a current target database. The associated data may describe a particular path upon which the target should be approached, a preferred orientation for the vehicle when positioned at the target, or other target-based considerations that should be observed by the vehicle as it approaches or parks at the target.

If, however, the target is dynamic, in step 908, the system evaluates the target to determine whether the target position was specified by an equipment operator (e.g., by a shovel operator specifying targets positioned on either side of the shovel). In that case, if the target information has not changed (e.g., the position of the shovel has not changed, and the operator has not indicated that the target is no longer valid), the system moves to step 906 and stores the target information.

If however, the targets were established by the target equipment operator and have changed (or may have changed), the system moves to step 910 where a request is issued to the target equipment operator to confirm, or re-establish the location of targets that are at least partially determined by the target vehicle location. In that case, the new targets may have associated with them a lifetime after which the targets are no longer valid.

Alternatively, the targets may be associated with a set of conditions that determine whether the target is valid. For example, when a shovel operator defines a set of targets around the shovel (e.g., targets 430 and 435 shown in FIG. 4), the targets may only be valid as long as the shovel remains unmoved. If, however, the shovel should move location, the targets would immediately become invalid and would have to be reestablished by the shovel operator. In some cases, though, targets whose locations are defined by target vehicle position can be located based upon a current position and orientation of the target vehicle without confirmation or feedback from an operator of the vehicle.

After receiving the updated or confirmed target locations from the target equipment operator, the target information is stored in step 906. After storing the target information (for example, in navigation aid 322 of FIG. 3), the target information can be compared to the current vehicle position and orientation to calculate a heading towards the target.

Returning to FIG. 8, after determining the target location and heading in step 812, as well as other target information (e.g., other parameters that may be used to identify a suitable approach to the target as determined in step 812, or any preceding steps), the system verifies that the target location and information is within acceptable parameters. For example, the system may verify that the target is within range of the vehicle. Additionally, all parameters such as target position, heading, and any other data related to the target position and heading may be checked to ensure that it has not expired, is within acceptable ranges, and has confidence levels that exceed predetermined thresholds. For example, if the last position update from a target vehicle or other moveable object was recorded more than a given number of minutes or seconds in the past, then the position may no longer be valid. Of course, validity requirements and confidence levels can differ as between fixed and moveable targets positions or objects, with the fixed targets having a longer validity duration than moveable targets.

Returning to FIG. 6, after determining the target position and heading, in step 608, the system identifies hazardous conditions or boundaries that may exist between the vehicle and the selected target. To perform this step, the system may access the distributed objects database that stores positional data for equipment, hazardous areas, geographical features, and other objects or features within the mine environment. The distributed objects database may also store additional information describing the hazards, such as a number of danger zones that may be defined around each hazard, or speed limits that may be established for particular routes through the mine.

Figure 10:
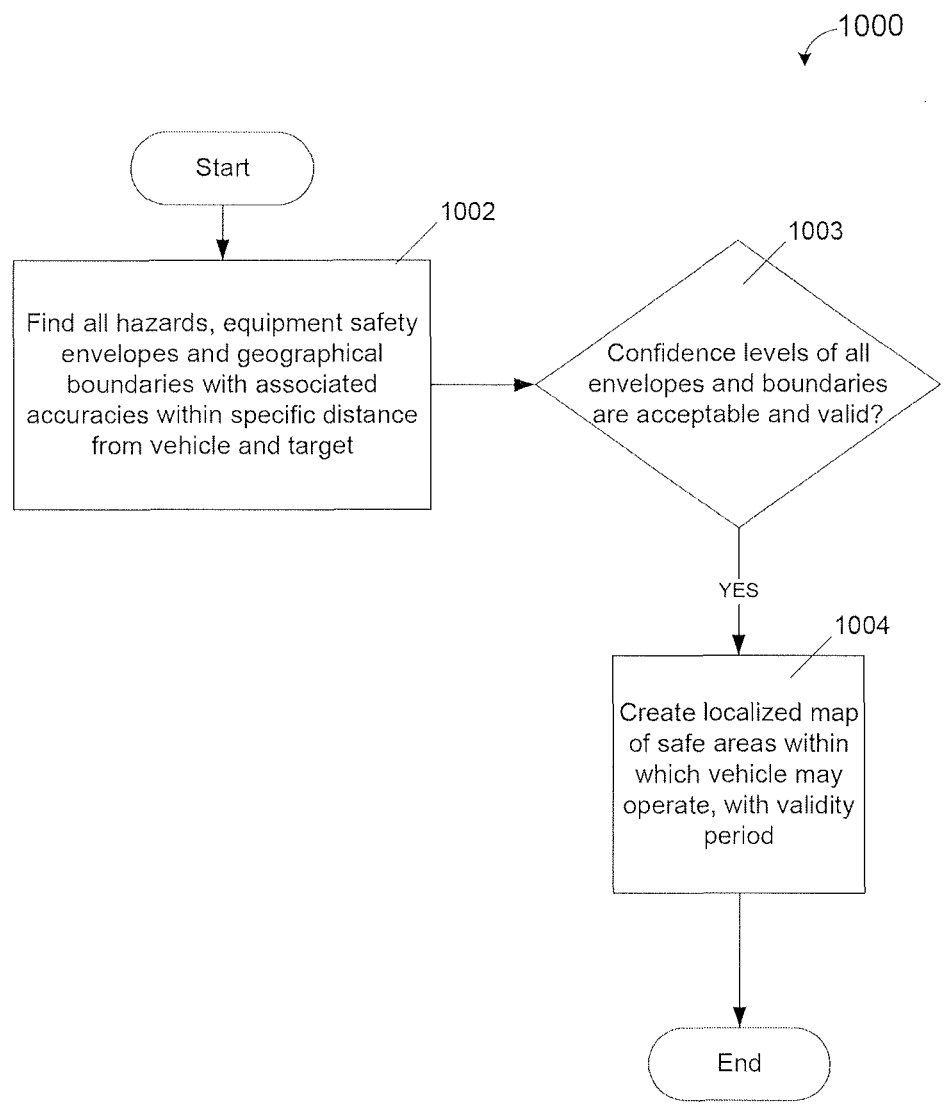

FIG. 10 is a flow chart showing a series of steps 1000 that may be undertaken to complete step 608 of FIG. 6. In step 1002, the system retrieves all hazardous conditions and boundaries that exist within a predetermined distance from the vehicle and the selected target. The hazards and boundaries can be retrieved from the distributed objects database described above. Each hazardous condition may have with it an associated consequence for coming near the hazardous condition. For example, each hazard may be associated with potential consequences such as "injury or death," "equipment damage," or "performance degradation" should the vehicle come into contact with, or enter a danger zone of a particular hazard.

Each hazard or boundary retrieved from the distributed objects database may have associated with it a particular accuracy rating indicating a confidence range for the accuracy of a particular hazard or boundary location.

In some cases, hazards may be somewhat dynamic. For example, hazards such as cable trees, blasting zones, other vehicles, or mining faces or cliffs can move continuously throughout the day. Accordingly, the distributed objects database is configured to store the most up-to-date location information for all hazards and boundaries that is accessible.

If the accuracy ratings or confidence levels associated with the hazards and boundaries are within acceptable levels (evaluated in step 1003), the system moves to step 1004 to create a virtual map of the mine site between the vehicle and the selected target that maps out hazards and boundaries that should be avoided by the vehicle when navigating to the selected target, otherwise an error may be generated. In some implementations, the map has a limited validity period. Upon expiration of the validity period, the map is rebuilt to ensure that the vehicle does not attempt to navigate using a stale map.

Returning to FIG. 6, in step 610, after identifying hazardous conditions or boundaries that may exist between the vehicle and the selected target, the system calculates a best path for the vehicle to the selected target in step 610 by calculating a path from the vehicle's current position to the target position. The path is selected based upon the defined criteria for success for the particular maneuver as well as established error conditions. Step 610 may also include calculated acceptable tolerances and/or corridors of safe movement along the calculated best path.

Figure 11:
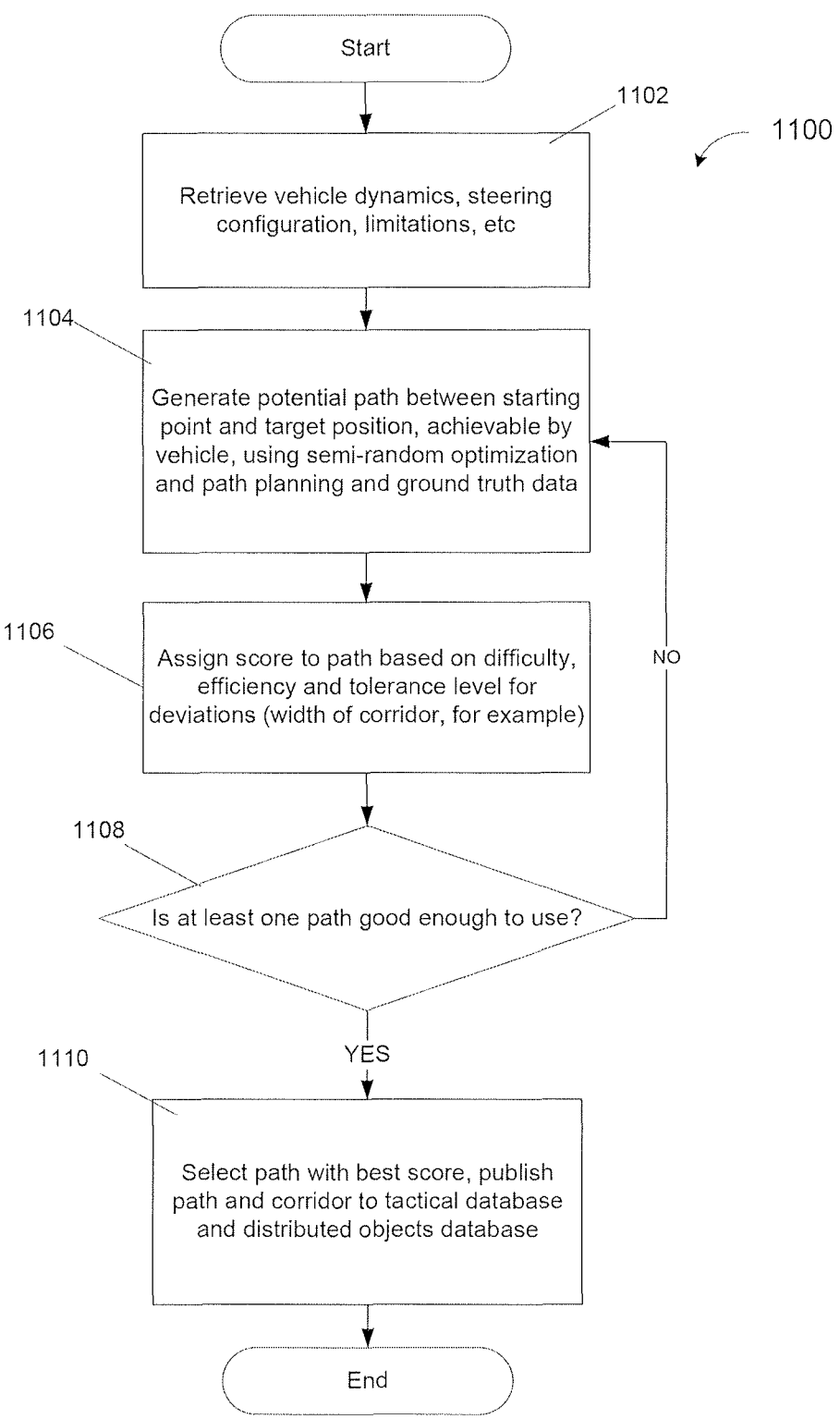

FIG. 11 is a flow chart showing a series of steps 1100 that may be undertaken to complete step 610 of FIG. 6. In step 1102, the system first identifies various performance characteristics of the vehicle. The characteristics can include steering configurations, such as whether the vehicle has four-wheel steering, and the vehicle's turning radius, performance information, such as stopping capabilities, and vehicle characteristics such as weight (either when loaded or unloaded). Depending upon the type of vehicle, the vehicle characteristics may also include buffer zones defined around the vehicle, where the buffer zone of the vehicle cannot overlap with any other hazards or boundaries identified by the system. In larger vehicles, for example, the buffer zones may be particularly large to ensure the vehicle does not come sufficiently close to a particular hazard or boundary to create a risk that an accident could occur. In some implementations, the buffer zones are defined by the maximum area that particular components of the vehicle can cover. For example, the buffer zones around a shovel may include the entire area that may be accessed by the shovel (e.g., the area covered by the bucket at full extension when processed through 360 degrees). In other cases, the buffer zones may be expanded to allow for the vehicle's turning wheel jutting out from the body of the vehicle during a turning maneuver). These vehicle characteristics (including the vehicle's buffer zone) can be retrieved from a vehicle condition monitor and/or configuration database (e.g., vehicle condition monitor 306 and/or configuration database 310).

In step 1104, after retrieving the vehicle characteristics, the system generates a first potential path between the vehicle and the selected target. The first potential path can be generated using semi-random optimization and path planning, or any other suitable process or algorithm for determining a candidate path. The path can be optimized based upon the data retrieved in step 1102, as well as any additional information describing the intermediate terrain (e.g., the virtual map generated in step 1004 of FIG. 10), or the selected target.

The potential paths can be limited by the vehicle's characteristics. For example, based upon the vehicle's turning radius, paths can be generated that would not require the vehicle to turn with a radius that is narrower than the vehicle's own optimum turning radius. Similarly, based upon the vehicle's ability to climb steep grades, the path can be generated to avoid any roadways or other routes that would require the vehicle to climb a slope that is too steep. Also, based upon the vehicle's weight (either loaded or unloaded), the path can be selected to ensure that the vehicle will only travel on roadways or paths that can support the necessary weight.

In one implementation, the potential paths are generated to minimize the build-up of ruts within the area between the vehicle and the target. As such, the system may be configured to inject a certain amount of 'dither' into a particular path to ensure that vehicles traveling on the same path do not create destructive or dangerous ruts. In one implementation, the position of each path through the mine environment can be adjusted based upon changing roadway conditions. As more and more vehicles utilize a particular roadway, for example, the position of the path defined through that roadway can be adjusted to avoid too many vehicles driving in the same area. Accordingly, in particular congested areas, the system can generate 'anti-rut' paths that are each configured to prevent multiple vehicles using the identical (or similar) paths to prevent rutting.

In one implementation, to prevent rutting, paths generated through congested areas are periodically varied, within acceptable boundaries, to prevent the build-up of ruts. The deviation can be selected randomly from alternative trajectories that ensure a continuous and steady travel within the congested area containing the originally-determined path.

After identifying a first potential path, the system assigns a score to the first potential path based upon the path's difficulty, efficiency, safety, and/or tolerance level for deviations. In one implementation, difficulty is evaluated based upon the number of turns that are required by a driver undertaking a particular task. Difficulty can also be affected by the type of the vehicle. For example, in some haul trucks the driver sits on the left side of the vehicle. In that case, because the driver has improved visibility from the left side of the vehicle over the right, left-hand turns would be rated easier than right-hand turns in the scoring algorithm. Similarly, when the selected target is in proximity to another vehicle (e.g., a target located next to a shovel), the difficulty can be evaluated based upon the visibility of the vehicle to an operator of the target vehicle. For example, when approaching a shovel, paths that allow the vehicle to be in view of the shovel operator for a greater length of time will be ranked easier than paths that obscure the shovel operator's view of the vehicle. By allowing for greater visibility, the shovel operator can more easily assist the vehicle to reach the desired target location.

In one implementation, to evaluate the safety of the potential path, the system analyzes how close to identified hazards and boundaries a particular path will cause the vehicle to operate. Although this analysis may be performed solely based on proximity to particular hazards (or hazard zones defined around particular geographical features or hazards) and boundaries, other factors can be used in evaluating the safety of a particular path. For example, using the consequences described above for particular hazards or boundaries, each path could be rated for any combination of safety, productivity, or cost in a tiered approach. The first tier would involve inefficiencies. For example, a particular path may be rated lower if it calls for the vehicle to pass through a particularly congested area of the mine, or take a longer route, for example. There may be little risk or damage or injury in that case, but the path would still result in loss of resources as it would take longer for the vehicle to reach the desired destination, and may consume more fuel as a result.

In a second tier, the paths can be scored based upon the likelihood of damage to equipment. If, for example, a particular path causes a vehicle to pass through an area of the mine where vehicle damage is likely to occur, perhaps due to road conditions, or other traffic, the path could be scored lower than other paths.

Finally, in a third tier, the paths can be scored based upon the likelihood of injury to mine workers. If, for example, a particular path causes a vehicle to pass through an area of the mine where injury is likely to occur (e.g., close to a blasting site, or near cliffs or other large drops), the path could be scored lower than other paths. In some cases, if there is any risk of injury, the path is immediately invalidated and a new path must be prepared.

In the tiered system described above, the tiers can be scaled so that risks of inefficiency do not result in as low a score as risks of equipment damage or injury or death. In some cases, if a particular path creates any risk of injury or death, that particular path is immediately allocated a score of 0 (or any other score indicating that under no circumstances will the path be used) and the process restarts at block 1104 by generating a new potential path.

In step 1108, if at least one potential path's score exceeds a particular threshold, the path is selected in step 1110. If, however, there are no paths having a sufficiently high score, the method returns to block 1104 and a new path is generated. This process repeats until a path having a sufficiently high score is generated.

In some cases, the system will initially generate a pool of candidate paths. Each path will then be scored, for example using the algorithm described above. The candidate paths can then be ranked, with the highest ranking path (assuming its score exceeds a particular threshold) being selected.

Figure 12:
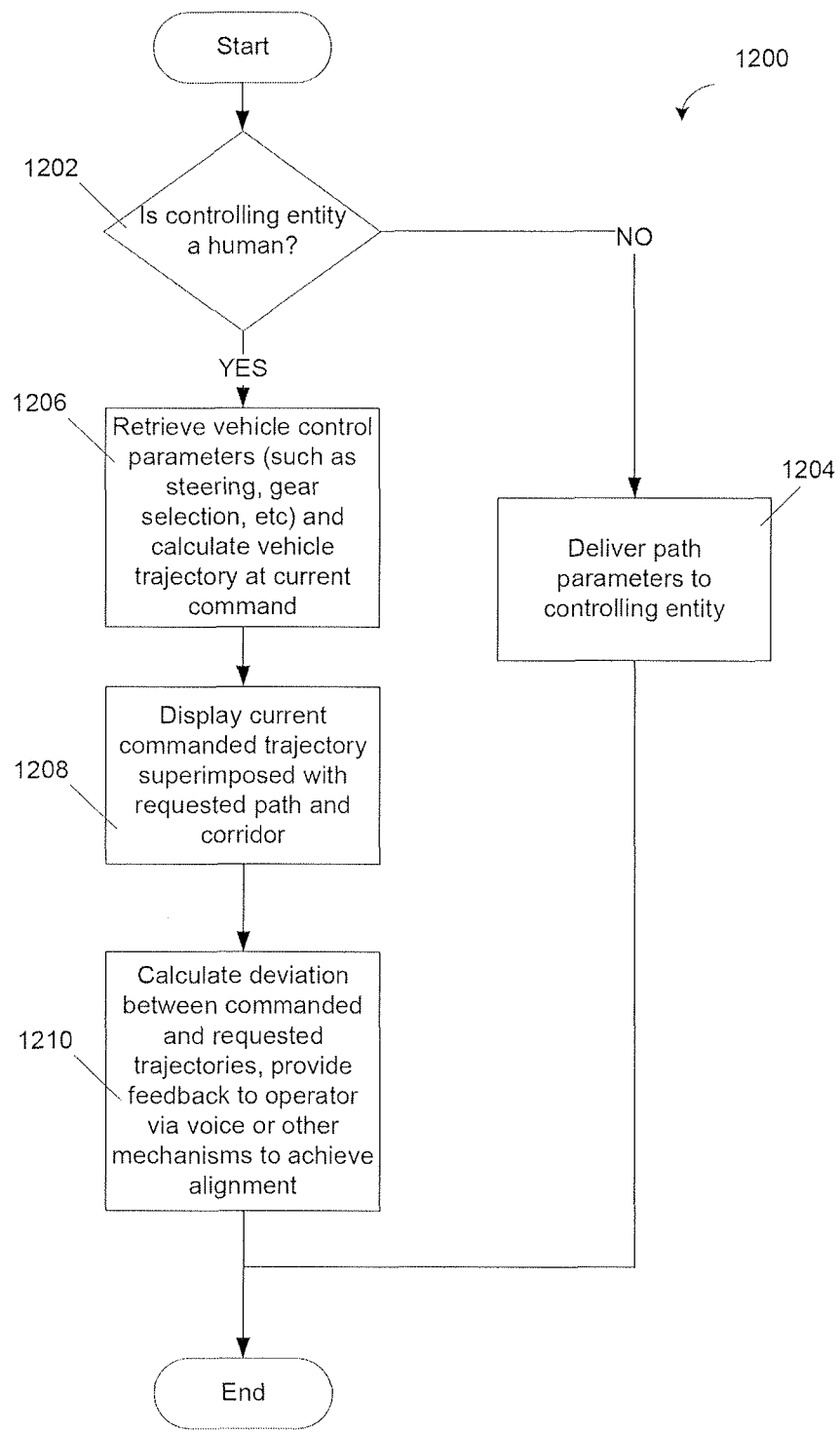

Returning to FIG. 6, after generating a suitable path to the target, in step 612 the system issues vehicle control orders and begins monitoring vehicle movement to provide feedback to an operator of the vehicle (if present). FIG. 12 is a flow chart showing a series of steps 1200 that may be undertaken to complete step 612 of FIG. 6.

In step 1202, the system first determines whether the vehicle is operated by a human driver, or if the vehicle is autonomous. If the vehicle is autonomous, in step 1204, the selected path is communicated to the vehicle control system. The controlling entity for the autonomous vehicle can then use the path to navigate the vehicle to the selected target.

If however, the vehicle is controlled by a human driver, the system retrieves the vehicle condition parameters and calculates the vehicle's trajectory in step 1204.

In step 1208, the system analyzes the current position of the vehicle and the selected path and determines a feedback trajectory that would cause the vehicle to follow the path. If for example, the vehicle has deviated from the path, the system would display a feedback trajectory for the operator that would cause the vehicle to return to the path in an efficient and safe manner.

In step 1210, the system identifies any existing deviation between the vehicle's current trajectory and the trajectory determined in step 1208. Using the vehicle condition data (e.g., turning radius, stopping distance, etc.) the system then determines whether any detected deviation is so great that the vehicle will be unable to return to the selected path based upon the vehicle's performance capabilities. For example, the vehicle's turning radius may be too great to return the vehicle to the selected path. In that case, the system can generate an error warning to the operator that the vehicle cannot return to the selected path. The operator can then restart the path selection process to generate a new path, or the system may automatically generate a new path. In some cases, the operator may have to navigate the vehicle away from the selected target to provide enough room for a new suitable path to be identified.

When warning the vehicle operator regarding deviations from the selected path, the present system may use any suitable user interface device for communicating such information. Heads up displays or other device display screens, warning sounds, voice cues, or other indicators can all be used to provide feedback to the operator.

Returning to FIG. 6, after generating the feedback trajectory, the system enters a control loop that allows the system to continually monitor the position and trajectory of the vehicle and generate feedback information that allows the vehicle to proceed down the selected path. In step 614, the operator of the vehicle (either autonomous or human driven) controls the vehicle for a predetermined period of time in step 614. After that time period elapses, the system evaluates the vehicle's current position and heading in step 616. In evaluating the vehicle's current position, the system can use a position sensor (e.g., position sensor 302 of FIG. 3) to identify the vehicle's current position and orientation. In some cases, though, where externally-mounted object detection systems are positioned around the selected target, as the vehicle gets close to the target, the vehicle can begin communication with the object detection systems to gather additional data describing the vehicle's current position and orientation. The data received from the vehicle-mounted position sensor can then be combined with the data received from the external system to generate more accurate position and orientation data. At that time, the system may also access the hazards and boundaries database to ensure that no new hazards have been created, or that hazards have not moved into the path of the vehicle.

In step 618, the system evaluates whether the vehicle has reached the selected target destination. If not, in step 620, the system evaluates whether the vehicle's current path and heading are within acceptable tolerances. If so, the system returns to step 612, analyzes the current vehicle position, heading, and the selected path and displays a new feedback trajectory to assist the vehicle operator in navigating along the path. Depending upon system implementation, the feedback information may instruct the vehicle operator to turn the vehicle's steering wheel by a particular amount to navigate back to the path. The system can also advise the driver to apply the brakes to slow the vehicle, or to undertake other maneuvers that are configured to return the vehicle to the path.

If the vehicle's current path and heading are not within acceptable tolerances, the system returns to step 610 and recalculates a new path to guide the vehicle to the selected target.

When the vehicle's position as determined in step 616 is determined to match the selected target's position, the vehicle is considered to have arrived at the target destination. Accordingly, step 618 has been satisfied and the system moves to step 622 to complete the maneuver. In step 622, the maneuver is completed and data collected during the maneuver can be stored for later analysis.

For example, during a particular maneuver, the system may periodically record the current position and heading of the vehicle, the current path, and information describing the current hazards and boundaries. That information can then be packaged and stored with metadata identifying the vehicle operator, current time, vehicle condition data, target information (e.g., target vehicle identification), and logical position. The dataset can then be stored in an offline system for review.

In some cases, because a vehicle cannot navigate directly into a target destination, a number of reverse points may be defined in close proximity to target destinations. The reverse points can be selected to allow a vehicle operator, for example, to execute a controlled turn before backing into a particular target destination. The reverse points may be particularly useful, for example, when a haul truck wishes to navigate into position beside a shovel for receiving material.

Figure 13:
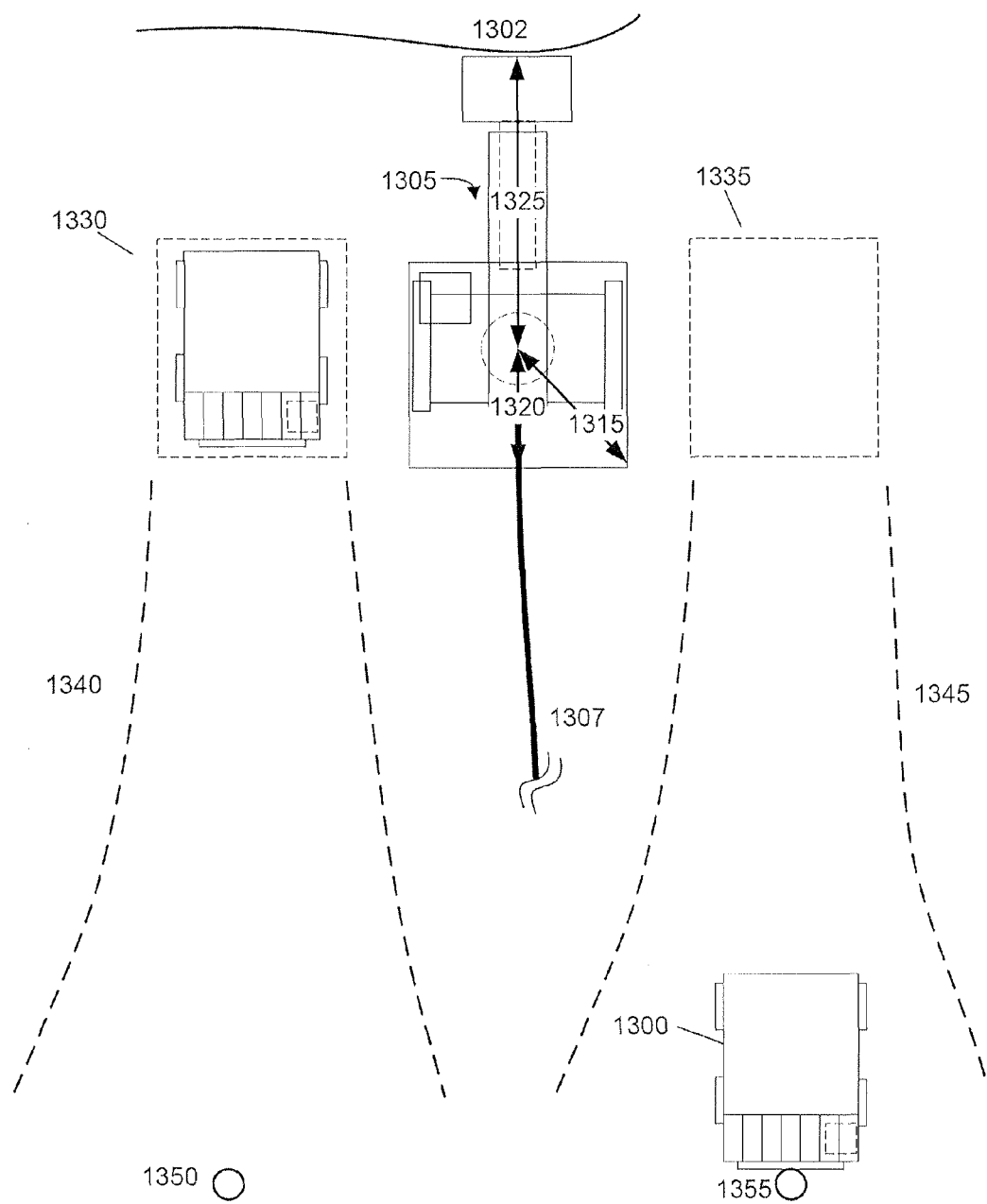
FIG. 13 shows an example use of the present system to assist trucks in entering and leaving loading areas defined proximate to a shovel.

FIG. 13 shows an example use of the present system to assist trucks in entering and leaving loading areas defined proximate to shovel 1305. The arrangement of FIG. 13 shows a power shovel 1305 positioned at a face 1302 for loading operations. Because the shovel can swing back and forth, there are two possible target destinations 1330 and 1335 that would allow a truck to position itself beside shovel 1305 to receive material.

In identifying the possible loading positions, there are a number of shovel-related parameters of interest that are helpful when devising a guided loading scheme. The most significant parameter is the shovel's location which can be measured directly by a GPS receiver or calculated on the basis of known dimensions of the shovel and the location of the GPS antenna. Additional useful parameters are the tail drag radius 1320, the corner drag radius 1315, and the boom radius 1325. These parameters set the outside envelope for the space the shovel will occupy during loading operations, and represent an area outside of which the loading positions must be located. These parameters are illustrated in FIG. 13 with reference to the center of rotation of the upper assembly of shovel 1305.

According to methods of the invention, two loading envelopes 1330 and 1335 are defined. The loading envelopes define the space in which haul trucks can be positioned prior to the commencement of loading. By defining loading positions on either side of shovel 1305, the loading of haul trucks can be made more efficient because shovel 1305 is not required to wait for access to a fresh haul truck. Instead, shovel 1305 can swing around to the new haul truck located on the other side of shovel 1305. Loading envelopes 1330 and 1335 are defined to be outside of the arc defined by the tail and/or corner of the shovel, but within the reach of the bucket. The size and orientation of the loading envelopes 1330 and 1335 can vary depending on the make and model of the haul truck, which determines the size and height of the truck bed.

Loading paths 1340 and 1345 are also defined, as described above. Loading paths 1340 and 1345 demarcate the acceptable space in which a haul truck may travel as it backs into a loading envelope. Loading paths 1340 and 1345 will generally be wider the farther the truck is from the loading envelope, requiring increasing precision as the truck nears the loading envelope. Additionally, loading paths 1340 and 1345 are defined in areas free of hazards or other no-go areas, for example, the area occupied by a dragline tether 1307 or overhead power cables.

Systems according to the invention also define reverse points 1350 and 1355. Reverse points 1350 and 1355 are the regions to which a haul truck can navigate prior to beginning its reverse movement along the loading paths 1340 and 1345 to the loading envelopes 1330 and 1335.

Loading envelopes 1330 and 1335, loading paths 1340 and 1345 and reverse points 1350 and 1355 can be defined in, for example, a distributed objects data or can be generated on-the-fly by a navigation system such as system 300 described above with respect to FIG. 3. The locations of these various features (e.g., loading envelopes 1330 and 1335, loading paths 1340 and 1345, and reverse points 1350 and 1355) are accessed by the system (e.g., system 300 of FIG. 3).

After identifying the various features, a navigation aid (e.g., navigation aid 322 of FIG. 3) accesses the features and uses them to guide mine haul trucks into position according to methods described above (see, for example, FIG. 6-12). Additionally, the central application can assign one of the two reverse points 1350 and 1355 to a given truck as part of a haul truck dispatch system. For example, when the central application is aware that a first truck is located at a first loading envelope 1330, a second truck is given a second reverse point 1355 as a waypoint to which to navigate. Reverse points 1350 and 1355 are generally assigned to trucks heading to shovel 1305 in an alternating sequential manner depending on expected time of arrival.

While one or more embodiments of the present invention have been illustrated in detail, the skilled artisan will appreciate that modifications and adaptations to those embodiments may be made without department from the scope of the present invention as set forth in the following claims.

We claim:

1. A system, comprising:
   a position sensor mounted to a haul truck, the position sensor being configured to identify a position of the haul truck;
   a navigation aid connected to the position sensor, the navigation aid being configured to:
      identify a target destination for the haul truck,
      calculate a path including the target destination, and
      use the position sensor to monitor a progress of the haul truck along the path; and
   a user interface connected to the navigation aid, the user interface being configured to
      display at least a portion of the path to an operator of the haul truck, and
      display a target trajectory for the haul truck, the target trajectory being configured to direct the haul truck along the path, wherein the target trajectory is at least partially determined by a target orientation of the haul truck at the target destination.

2. The system of claim 1, wherein the navigation aid is configured to display a second target trajectory for the haul truck, the second target trajectory being configured to direct the haul truck to the path.

3. The system of claim 1, wherein the path includes a current position of the haul truck.

4. The system of claim 1, wherein the path is selected to avoid hazards or boundaries within a mining environment.

5. The system of claim 1, wherein the path is at least partially determined by an operational limit of the haul truck.

6. The system of claim 1, wherein the navigation aid is configured to determine whether the haul truck has sufficient fuel to navigate along the path.

7. The system of claim 1, wherein the navigation aid is configured to, when the navigation aid detects the haul truck deviating from the path, display a warning to an operator of the haul truck using the user interface.

8. The system of claim 1, wherein the navigation aid is configured to:
   identify a performance characteristic of the haul truck; and
   when the haul truck deviates from the path, use the performance characteristic to determine whether the haul truck is capable of returning to the path.

9. A method, comprising:
   determining a location of a target destination within a mining environment;
   calculating a path including the target destination through the mining environment;
   monitoring a progress of a haul truck along the path using a position sensor;
   when the haul truck is located away from the path, causing a navigation aid in the haul truck to display on a display screen of the navigation aid a first target trajectory for the haul truck, the first target trajectory being configured to direct the haul truck to the path and wherein the first target trajectory is at least partially determined by a target orientation of the haul track at the target destination; and when the haul truck is located on the path, causing the navigation aid in the haul truck to display on the display screen of the navigation aid a second target trajectory for the haul truck, the second target trajectory being configured to direct the haul truck along the path.

10. The method of claim 9, wherein the path is selected to avoid hazards or boundaries within a mining environment.

* * * * *